United States Patent
Gohara

(10) Patent No.: US 10,661,163 B2
(45) Date of Patent: May 26, 2020

(54) VIDEO GAME WITH HAPTIC SIGNAL THAT IS DISABLED BASED ON LOSING CONTACT WITH A SURFACE

(71) Applicant: Nintendo Co., Ltd., Kyoto (JP)

(72) Inventor: Shigetoshi Gohara, Kyoto (JP)

(73) Assignee: NINTENDO CO., LTD., Kyoto (JP)

(*) Notice: Subject to any disclaimer, the term of this patent is extended or adjusted under 35 U.S.C. 154(b) by 0 days.

(21) Appl. No.: 15/987,261

(22) Filed: May 23, 2018

(65) Prior Publication Data

US 2018/0345138 A1    Dec. 6, 2018

(30) Foreign Application Priority Data

Jun. 2, 2017   (JP) ................. 2017-109999

(51) Int. Cl.
   *G06F 3/01*   (2006.01)
   *A63F 13/285*   (2014.01)
   *A63F 13/57*   (2014.01)

(52) U.S. Cl.
   CPC ........... *A63F 13/285* (2014.09); *A63F 13/57* (2014.09)

(58) Field of Classification Search
   CPC ...... A63F 13/285; A63F 13/54; A63F 13/577; G06F 3/016; G06F 2203/013
   See application file for complete search history.

(56) References Cited

U.S. PATENT DOCUMENTS

| | | |
|---|---|---|
| 5,734,373 A | 3/1998 | Rosenberg et al. |
| 6,645,076 B1 | 11/2003 | Sugai |
| 6,752,716 B1 * | 6/2004 | Nishimura .............. A63F 13/08 463/6 |
| 6,864,877 B2 | 3/2005 | Braun et al. |
| 7,070,507 B2 | 7/2006 | Nishiumi |
| 7,733,637 B1 | 6/2010 | Lam |
| 8,059,089 B2 | 11/2011 | Daniel |
| 8,972,617 B2 | 3/2015 | Hirschman |
| 9,118,750 B2 | 8/2015 | Vossoughi |
| 9,126,119 B2 | 9/2015 | Joynes |
| 9,529,447 B2 | 12/2016 | Hodges |
| 9,711,980 B2 | 7/2017 | Hodges |

(Continued)

FOREIGN PATENT DOCUMENTS

| | | |
|---|---|---|
| EP | 2 810 699 | 12/2014 |
| GB | 2508137 | 5/2014 |

(Continued)

OTHER PUBLICATIONS

Notice of Reasons for Refusal dated May 30, 2019, issued in Japanese Application No. 2017-110647 (4 pages).

(Continued)

*Primary Examiner* — Lawrence S Galka
(74) *Attorney, Agent, or Firm* — Nixon & Vanderhye, P.C.

(57) ABSTRACT

Provided is an example system in which a vibrator continues to vibrate when a player character is in contact with a ground object in a virtual space. When the player character performs a jumping motion in the virtual space according to an operation performed by a player, the player character leaves the ground object. While the player character is performing a jumping motion, the vibration of the vibrator is temporarily stopped. When the player character drops on the ground object again, the vibration of the vibrator is resumed.

24 Claims, 13 Drawing Sheets

(56) References Cited

U.S. PATENT DOCUMENTS

| | | |
|---|---|---|
| 9,753,537 B2 | 9/2017 | Obana |
| 9,808,713 B1 | 11/2017 | Townley |
| 9,833,702 B2 | 12/2017 | Obana et al. |
| 9,855,498 B2 | 1/2018 | Townley |
| 10,062,247 B2 | 8/2018 | Obana et al. |
| 10,135,412 B2 | 11/2018 | Obana et al. |
| 10,286,310 B2 | 5/2019 | Obana et al. |
| 10,335,676 B2 | 7/2019 | Gohara |
| 2001/0016517 A1 | 8/2001 | Nishiumi et al. |
| 2002/0080112 A1 | 6/2002 | Braun et al. |
| 2002/0155890 A1 | 10/2002 | Ha |
| 2004/0023719 A1 | 2/2004 | Hussaini |
| 2006/0046843 A1 | 3/2006 | Nakajima |
| 2006/0290662 A1 | 12/2006 | Houston et al. |
| 2008/0155415 A1 | 6/2008 | Yoon et al. |
| 2009/0131171 A1 | 5/2009 | Miyazaki |
| 2010/0153845 A1 | 6/2010 | Gregorio et al. |
| 2010/0250815 A1 | 9/2010 | Street |
| 2010/0260996 A1 | 10/2010 | Chen |
| 2011/0053691 A1 | 3/2011 | Bryant |
| 2011/0134034 A1 | 6/2011 | Daniel |
| 2011/0260969 A1 | 10/2011 | Workman |
| 2011/0260996 A1 | 10/2011 | Henricson |
| 2012/0150431 A1 | 6/2012 | Ooka |
| 2012/0162113 A1 | 6/2012 | Lee |
| 2013/0095925 A1 | 4/2013 | Xu |
| 2013/0178285 A1 | 7/2013 | Joynes |
| 2013/0178290 A1 | 7/2013 | Joynes |
| 2013/0207792 A1 | 8/2013 | Lim et al. |
| 2013/0267322 A1 | 10/2013 | South |
| 2013/0281212 A1 | 10/2013 | Tsuchiya et al. |
| 2013/0318438 A1 | 11/2013 | Afshar |
| 2013/0342339 A1 | 12/2013 | Kiefer |
| 2014/0056461 A1 | 2/2014 | Afshar |
| 2014/0184508 A1 | 7/2014 | Tamasi |
| 2014/0205260 A1* | 7/2014 | Lacroix ................. H04N 5/765 386/201 |
| 2014/0206451 A1 | 7/2014 | Helmes |
| 2014/0210756 A1 | 7/2014 | Lee |
| 2014/0247246 A1 | 9/2014 | Maus |
| 2014/0248957 A1 | 9/2014 | Eck et al. |
| 2014/0274394 A1 | 9/2014 | Willis |
| 2014/0341386 A1 | 11/2014 | Cimaz |
| 2015/0084900 A1 | 3/2015 | Hodges |
| 2015/0160772 A1 | 6/2015 | Takeuchi |
| 2015/0205328 A1 | 7/2015 | Lin |
| 2015/0209668 A1 | 7/2015 | Obana et al. |
| 2015/0263685 A1 | 9/2015 | Obana et al. |
| 2015/0323996 A1 | 11/2015 | Obana |
| 2015/0355711 A1 | 12/2015 | Rihn |
| 2015/0356838 A1* | 12/2015 | Obana ................. G06F 3/016 340/407.1 |
| 2015/0356868 A1 | 12/2015 | Cuende Alonso |
| 2016/0192067 A1 | 6/2016 | Obana et al. |
| 2016/0209968 A1 | 7/2016 | Taylor |
| 2016/0231773 A1 | 8/2016 | Inoue |
| 2017/0176202 A1 | 6/2017 | Anderson |
| 2017/0199569 A1* | 7/2017 | Cruz-Hernandez ..... G06F 3/016 |
| 2017/0361222 A1 | 12/2017 | Tsuchiya et al. |
| 2018/0078422 A1 | 3/2018 | Dierenbach |
| 2018/0181201 A1* | 6/2018 | Grant .................. G06F 3/016 |
| 2018/0203509 A1 | 7/2018 | Yamano et al. |
| 2018/0203510 A1 | 7/2018 | Yamano et al. |
| 2019/0039092 A1 | 2/2019 | Kim et al. |

FOREIGN PATENT DOCUMENTS

| | | |
|---|---|---|
| JP | 9-206475 A | 8/1997 |
| JP | 11-33229 A | 2/1999 |
| JP | 2000-245964 | 9/2000 |
| JP | 2003-199974 | 7/2003 |
| JP | 2003-275464 | 9/2003 |
| JP | 2004-057654 | 2/2004 |
| JP | 2006-068210 | 3/2006 |
| JP | 2006-087938 A | 4/2006 |
| JP | 2009-061161 | 3/2009 |
| JP | 2013-164845 | 8/2013 |
| JP | 2013-236909 | 11/2013 |
| JP | 2015-141647 | 8/2015 |
| JP | 2015-172899 | 10/2015 |
| JP | 2015-232786 | 12/2015 |
| JP | 2015-232880 | 12/2015 |
| JP | 2016-123513 | 7/2016 |
| JP | 2017/043400 | 3/2017 |
| JP | 2018/016107 | 1/2018 |
| WO | 2011/043292 | 4/2011 |
| WO | 2013/049248 | 4/2013 |

OTHER PUBLICATIONS

Office Action dated May 1, 2019, issued in U.S. Appl. No. 15/987,178 to Yamashita et al., filed May 23, 2018 (10 pages).

Notice of Reasons for Refusal dated Apr. 10, 2019, issued in Japanese Application No. 2017-109998 (4 pages).

Steam, "A Different Kind of Gamepad", http://store.steampowered.com/livingroom/SteamController/, printed on Dec. 19, 2014, 10 pages.

Immersion, Patent Markings, retrieved Aug. 7, 2018, 2 pages. https://www.immersion.com/legal/trademarks-and-patent-markings/.

Office Action dated Jul. 31, 2019 issued in Japanese Application No. 2017-109999 (4 pgs.).

Office Action dated Aug. 8, 2019, issued in related U.S. Appl. No. 15/987,344.

U.S. Appl. No. 15/987,178, filed May 23, 2018, Information Processing System, Non-Transitory Storage Medium Having Stored Therein Information Processing Program, Information Processing Apparatus, and Information Processing Method.

U.S. Appl. No. 15/987,261, filed May 23, 2018, Non-Transitory Storage Medium Having Stored Therein Game Program, Information Processing Apparatus, Information Processing System, and Information Processing Method.

U.S. Appl. No. 15/987,344, filed May 23, 2018, Information Processing System, Non-Transitory Storage Medium Having Stored Therein Information Processing Program, Information Processing Apparatus, and Information Processing Method.

Japanese Office Action for corresponding JP2017-109999, dated Feb. 27, 2020, 4 Pages.

* cited by examiner

VIDEO GAME WITH HAPTIC SIGNAL THAT IS DISABLED BASED ON LOSING CONTACT WITH A SURFACE

CROSS REFERENCE CROSS REFERENCE TO RELATED APPLICATION

The disclosure of Japanese Patent Application No. 2017-109999, filed Jun. 2, 2017, is incorporated herein by reference.

FIELD

The present exemplary embodiment relates to a non-transitory storage medium having stored therein a game program that causes a vibrator to vibrate, an information processing apparatus, an information processing system, and an information processing method.

BACKGROUND AND SUMMARY

Systems equipped with a vibrator have conventionally been proposed. In such conventional systems, the vibrator is caused to vibrate according to the location of a vibration source.

However, in the above conventional technique, the location of the vibration source is perceived with the help of the vibration of the vibrator, and there is room for improvement in allowing a player to recognize or localize the vibration source.

Therefore, it is an object of the present exemplary embodiment to provide a program, apparatus, system, and method that control a vibration such that a player can easily recognize a situation of a vibration in a virtual space.

In order to achieve the object described above, the following configuration examples are exemplified.

The present exemplary embodiment provides a game program executable by a computer of an information processing apparatus. The game program causes the computer to execute an operation object control step and a vibration control step. In the operation object control step, an operation object in a virtual space is controlled, based on an operation performed by a player, and if the operation is performed with the operation object being in contact with a surface in the virtual space, the operation object is caused to perform a motion of leaving the surface. In the vibration control step, a vibrator is controlled such that the vibrator performs a first vibration when the operation object is in contact with the surface in the virtual space, and the vibrator does not perform the first vibration when the operation object is away from the surface due to the motion.

According to the above feature, the vibrator can be controlled such that the vibrator performs the first vibration when the operation object is in contact with the surface, and the vibrator does not perform the first vibration when the operation object leaves the surface due to the motion corresponding to the player's operation. As a result, the player is allowed to easily recognize that the surface in the virtual space is vibrating, and therefore, is allowed to recognize a situation of the virtual space, based on a vibration.

Further, in another feature, the vibration control step may further include controlling the vibrator, based on a game process, such that the vibrator performs a second vibration different from the first vibration. When the vibrator is caused to perform the second vibration in the vibration control step, the vibrator may be controlled to perform the first and second vibrations when the operation object is in contact with the surface, and the vibrator may be controlled to perform the second vibration without performing the first vibration when the operation object is away from the surface due to the motion.

According to the above feature, when the operation object is away from the surface, a situation in which only the first vibration is stopped can be provided.

Further, in another feature, the surface may be a ground set in the virtual space.

According to the above feature, when the operation object is on a ground in the virtual space, the first vibration can be performed, and when the operation object is away from a ground in the virtual space, the first vibration can be stopped.

Further, in another feature, the motion of leaving the surface may be a jumping motion of the operation object.

According to the above feature, the vibrator is allowed not to perform the first vibration when the operation object performs the jumping motion, so that the operation object leaves the surface.

Further, in another feature, in the vibration control step, the vibrator may be caused to perform the first vibration with a strength corresponding to a location in the virtual space of the operation object.

According to the above feature, the vibrator is allowed to vibrate with a strength varying according to the location in the virtual space of the operation object. For example, the player is allowed to recognize a positional relationship between the operation object and a vibration source, based on the vibration strength of the vibrator.

Further, in another feature, the vibrator may include a first vibrator and a second vibrator. In the vibration control step, a vibration strength of each of the first and second vibrators may be controlled according to a location of the operation object.

According to the above feature, the two vibrators can be caused to vibrate according to the location of the operation object. For example, by changing the vibration strengths of the vibrators, the player is allowed to recognize a positional relationship between the operation object and a vibration source.

Further, in another exemplary embodiment, an information processing apparatus or system for executing the above game program may be provided. Further, in another exemplary embodiment, an information processing method including the steps of the above game program may be provided.

According to the exemplary embodiment, a player is allowed to easily recognize that a surface in a virtual space is vibrating, and is allowed to recognize a situation of a vibration in a virtual space.

These and other objects, features, aspects and advantages of the present exemplary embodiment will become more apparent from the following detailed description of the present exemplary embodiment when taken in conjunction with the accompanying drawings.

BRIEF DESCRIPTION OF THE DRAWINGS

FIG. 11 is an example non-limiting diagram showing an example of timings of a jumping motion of a player character P and vibrations of vibrators 107 and 117;

DETAILED DESCRIPTION OF NON-LIMITING EXAMPLE EMBODIMENTS

Figure 1:
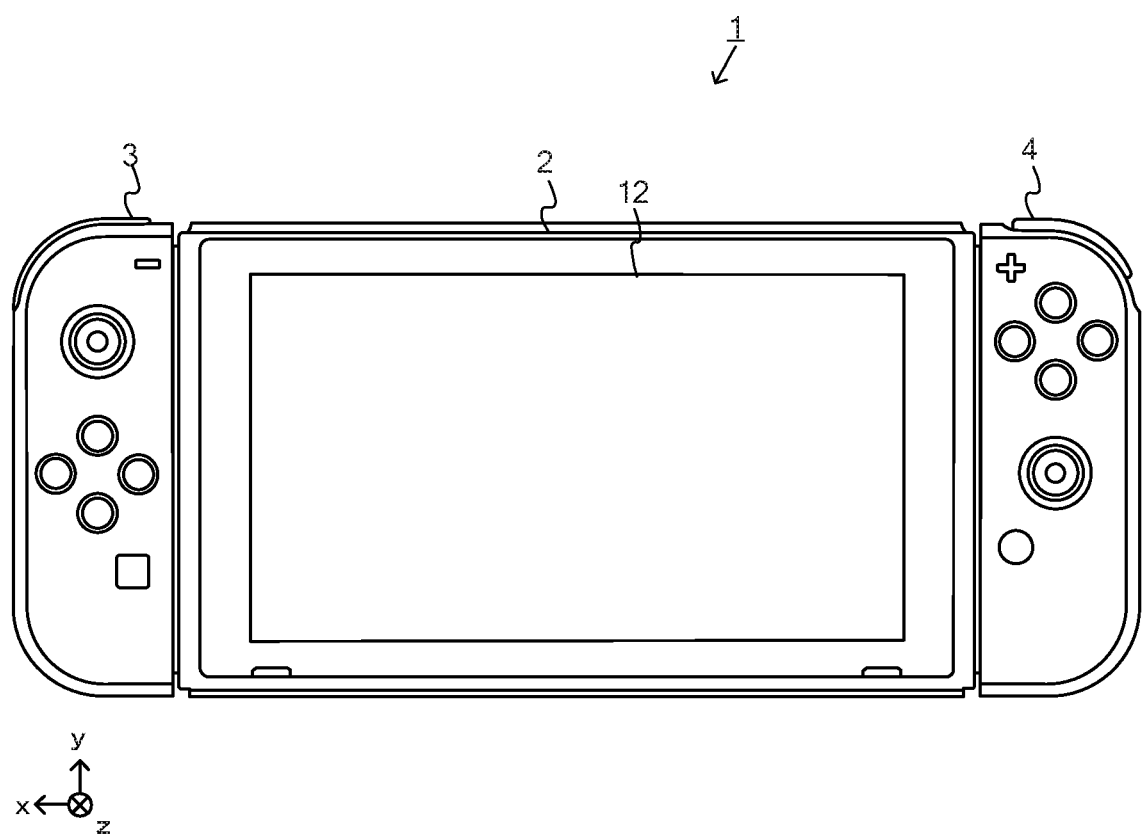
FIG. 1 is an example non-limiting diagram showing an example of a state in which a left controller 3 and a right controller 4 are attached to a main body apparatus 2.

A game system according to an example of an exemplary embodiment will now be described. An example of a game system 1 according to the exemplary embodiment includes a main body apparatus (an information processing apparatus that functions as a game apparatus main body in the exemplary embodiment) 2, a left controller 3, and a right controller 4. Each of the left and right controllers 3 and 4 is attachable to and detachable from the main body apparatus 2. That is, the game system 1 can be used as a unified apparatus obtained by attaching each of the left and right controllers 3 and 4 to the main body apparatus 2. Further, in the game system 1, the main body apparatus 2, the left controller 3, and the right controller 4 can also be used as separate bodies (see FIG. 2). In the description that follows, a hardware configuration of the game system 1 according to the exemplary embodiment is described, followed by a description of the control of the game system 1 according to the exemplary embodiment.

FIG. 1 is a diagram showing an example of the state in which the left and right controllers 3 and 4 are attached to the main body apparatus 2. As shown in FIG. 1, each of the left and right controllers 3 and 4 is attached to and unified with the main body apparatus 2. The main body apparatus 2 is for performing various processes (e.g., game processes) in the game system 1. The main body apparatus 2 includes a display 12. Each of the left and right controllers 3 and 4 includes operating portions with which a user provides inputs.

Figure 2:
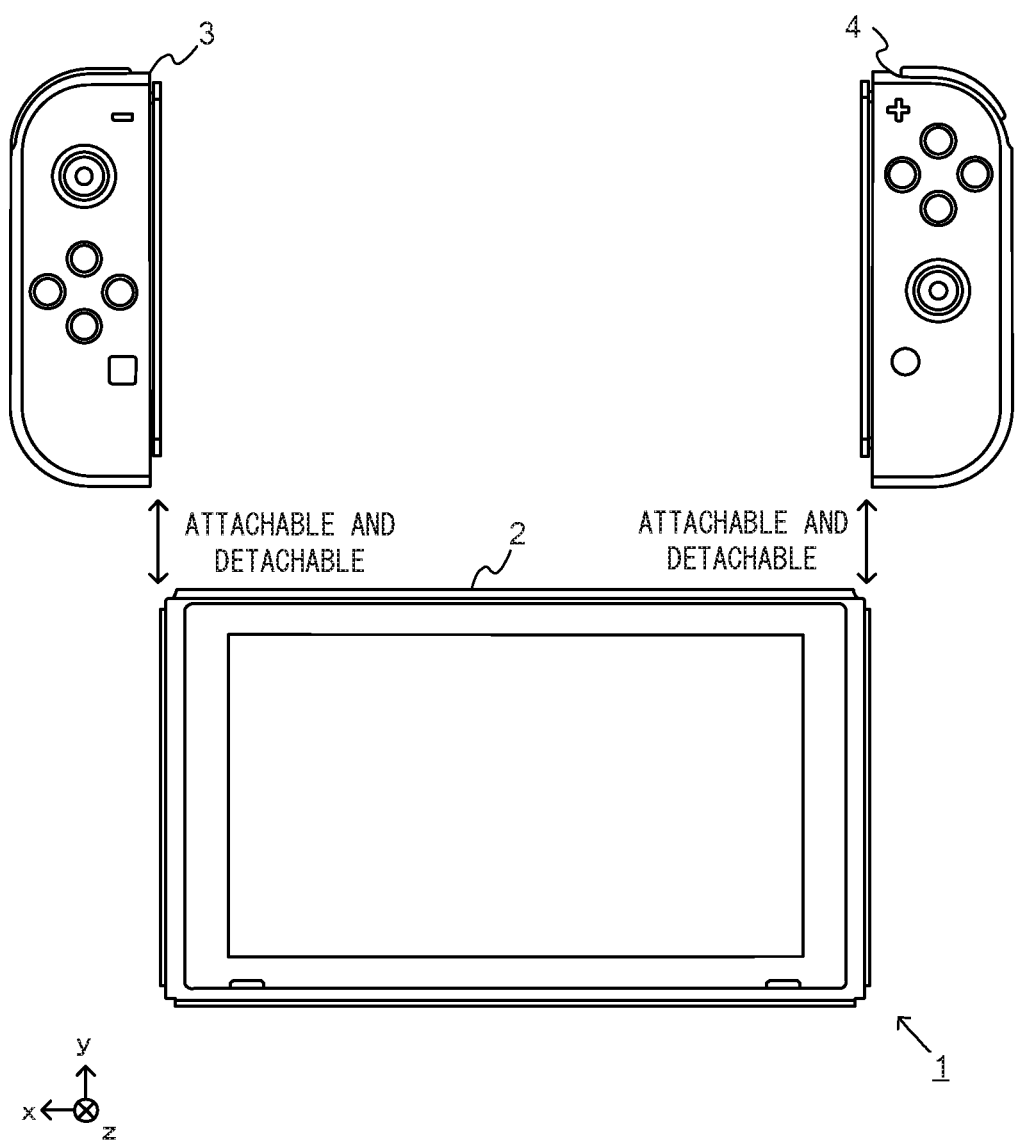
FIG. 2 is an example non-limiting diagram showing an example of a state in which each of left and right controllers 3 and 4 is detached from a main body apparatus 2.

FIG. 2 is a diagram showing an example of the state in which each of the left and right controllers 3 and 4 is detached from the main body apparatus 2. As shown in FIGS. 1 and 2, the left and right controllers 3 and 4 are attachable to and detachable from the main body apparatus 2. It should be noted that the left and right controllers 3 and 4 may also be hereinafter collectively referred to as "the controller" or "the controllers."

Figure 3:
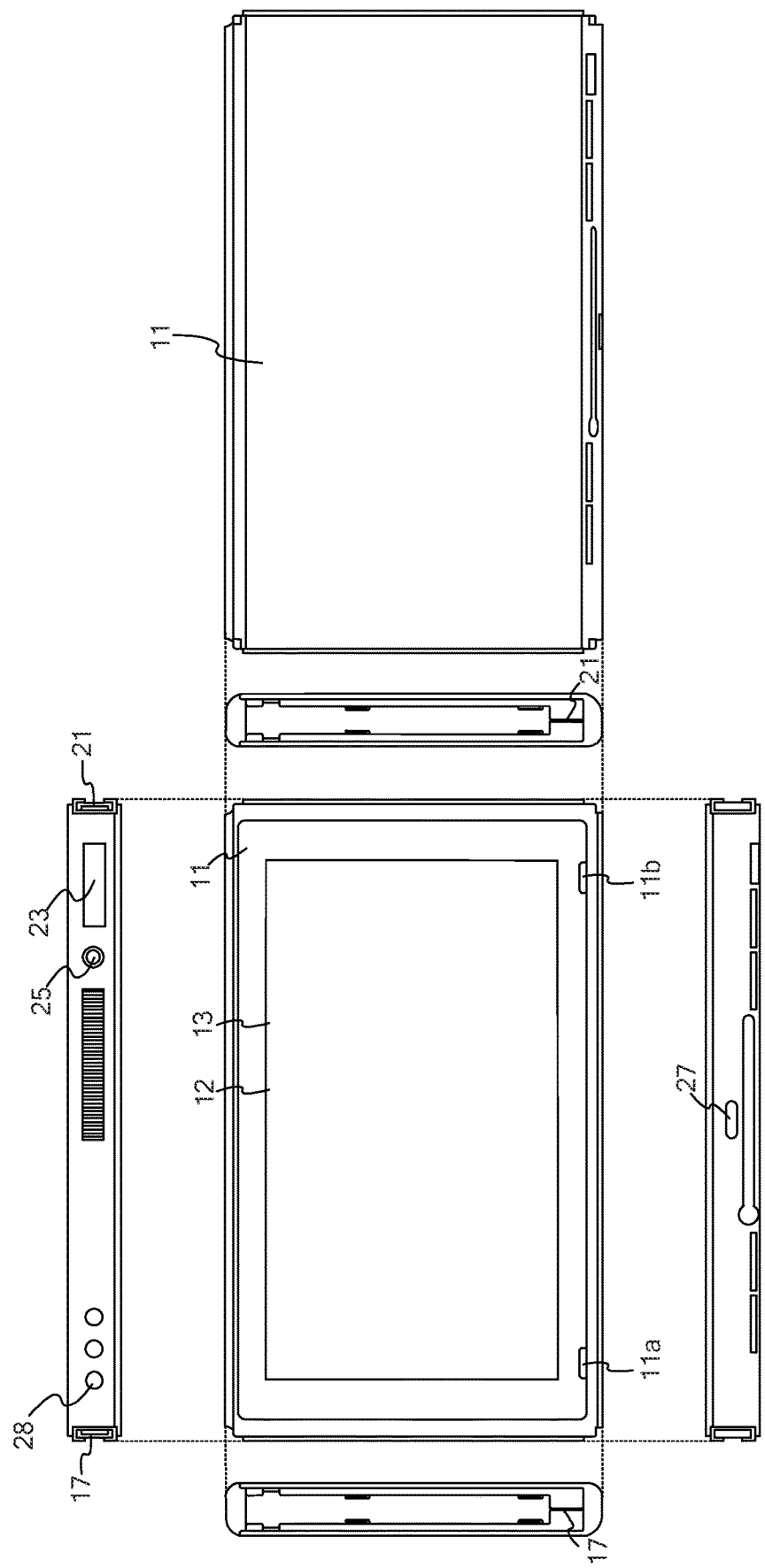
FIG. 3 is an example non-limiting diagram having six orthogonal views showing an example of a main body apparatus 2.

FIG. 3 is a diagram having six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the housing 11 may have any suitable shape and size. As an example, the housing 11 may be of a portable size. Further, the main body apparatus 2 alone or the unified apparatus obtained by attaching the left and right controllers 3 and 4 to the main body apparatus 2 may function as a mobile apparatus. The main body apparatus 2 or the unified apparatus may also function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be any type of display device.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed in the main surface of the housing 11. Then, output sounds of the speakers 88 are output through the speaker holes 11a and 11b.

Further, the main body apparatus 2 includes a left terminal 17 for allowing the main body apparatus 2 to perform wired communication with the left controller 3, and a right terminal 21 for allowing the main body apparatus 2 to perform wired communication with the right controller 4.

As shown in FIG. 3, the main body apparatus 2 includes a slot 23. The slot 23 is provided in an upper side surface of the housing 11. The slot 23 is so shaped as to allow a predetermined type of storage medium to be loaded in the slot 23. The predetermined type of storage medium is, for example, a dedicated storage medium (e.g., a dedicated memory card) to the game system 1 and an information processing apparatus of the same type as that of the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is for allowing the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle also functions as a hub device (specifically, a USB hub).

Figure 4:
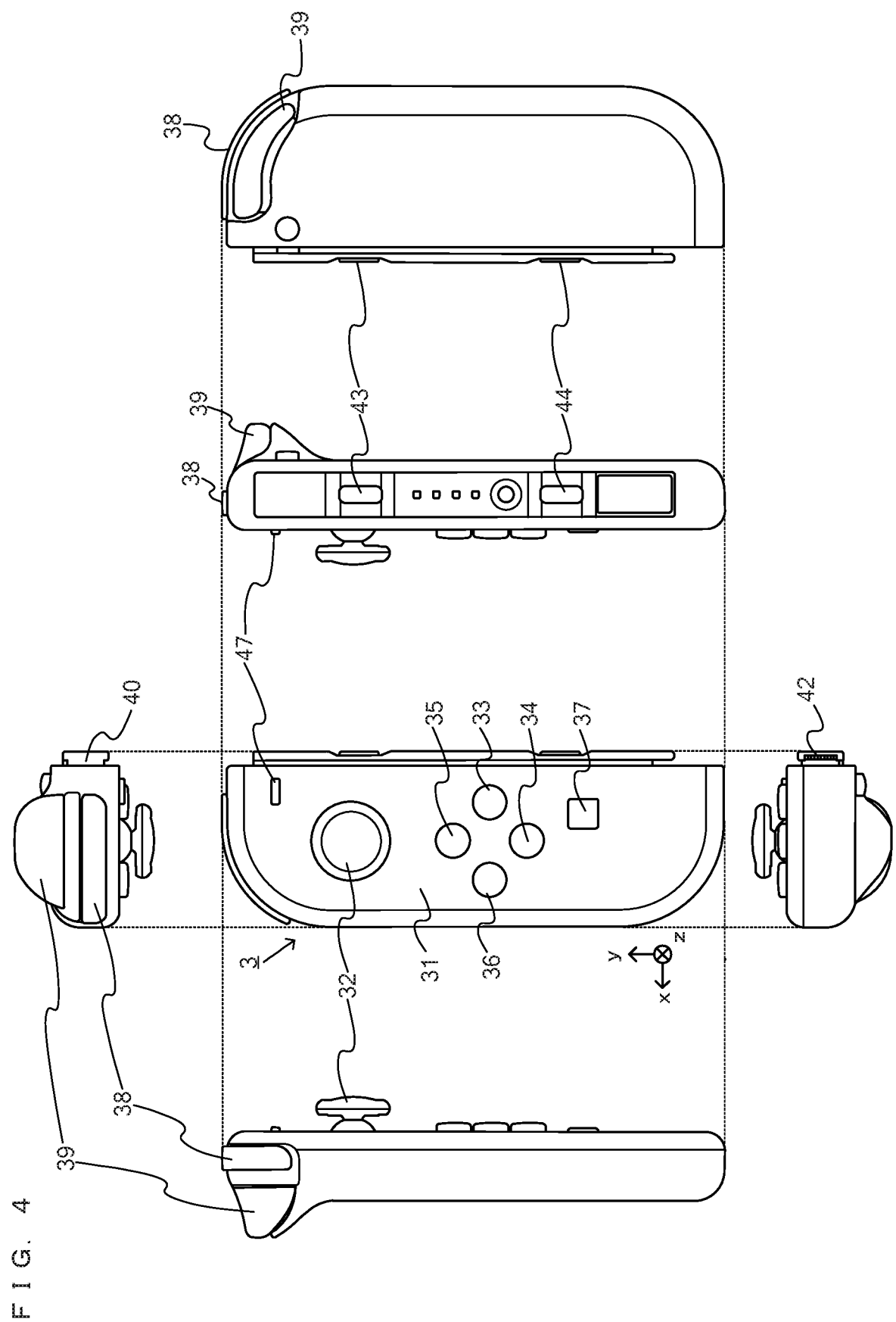
FIG. 4 is an example non-limiting diagram having six orthogonal views showing an example of a left controller 3.

FIG. 4 is a diagram having six orthogonal views showing an example of the left controller 3. As shown in FIG. 4, the left controller 3 includes a housing 31. In the exemplary embodiment, the housing 31 is longer than it is wide, i.e., is shaped to be long in the vertical direction (i.e., the y-axis direction shown in FIGS. 1 and 4). In the state in which the left controller 3 is detached from the main body apparatus 2, the left controller 3 can also be held in the portrait orientation. The housing 31 has such a shape and size that when held in the portrait orientation, the housing 31 can be held by one hand, particularly the left hand. Further, the left controller 3 can also be held in the landscape orientation. When held in the landscape orientation, the left controller 3 may be held by both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing down the analog stick 32.

The left controller 3 includes various operation buttons. The left controller 3 includes four operation buttons 33 to 36 (specifically, a "right" button 33, a "down" button 34, an "up" button 35, and a "left" button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for allowing the left controller 3 to perform wired communication with the main body apparatus 2.

Figure 5:
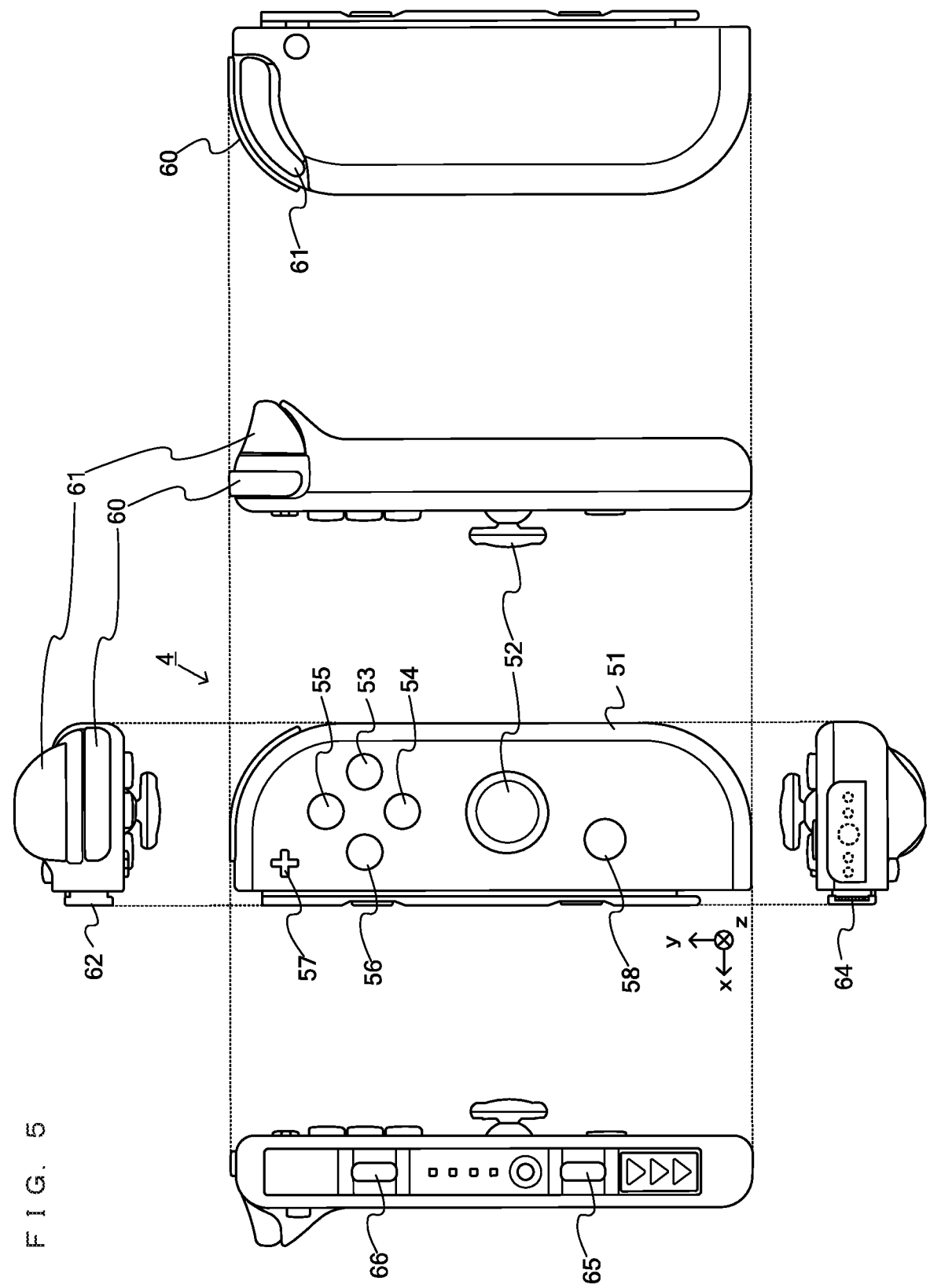
FIG. 5 is an example non-limiting diagram having six orthogonal views showing an example of a right controller 4.

FIG. 5 is a diagram having six orthogonal views showing an example of the right controller 4. As shown in FIG. 5, the right controller 4 includes a housing 51. In the exemplary embodiment, the housing 51 is longer than it is wide, i.e., is shaped to be long in the vertical direction. In the state in which the right controller 4 is detached from the main body apparatus 2, the right controller 4 can also be held in the portrait orientation. The housing 51 has such a shape and size that when held in the portrait orientation, the housing 51 can be held by one hand, particularly the right hand. Further, the right controller 4 can also be held in the landscape orientation. When held in the landscape orientation, the right controller 4 may be held by both hands.

As with the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, as with the left controller 3, the right controller 4 includes four operation buttons 53 to 56 (specifically, an A-button 53, a B-button 54, an X-button 55, and a Y-button 56). Further, the right controller 4 includes a "+" (plus) button 57 and a home button 58. Further, the right controller 4 includes a first R-button 60 and a ZR-button 61 in an upper right portion of a side surface of the housing 51. Further, as with the left controller 3, the right controller 4 includes a second L-button 65 and a second R-button 66.

Further, the right controller 4 includes a terminal 64 for allowing the right controller 4 to perform wired communication with the main body apparatus 2.

Figure 6:
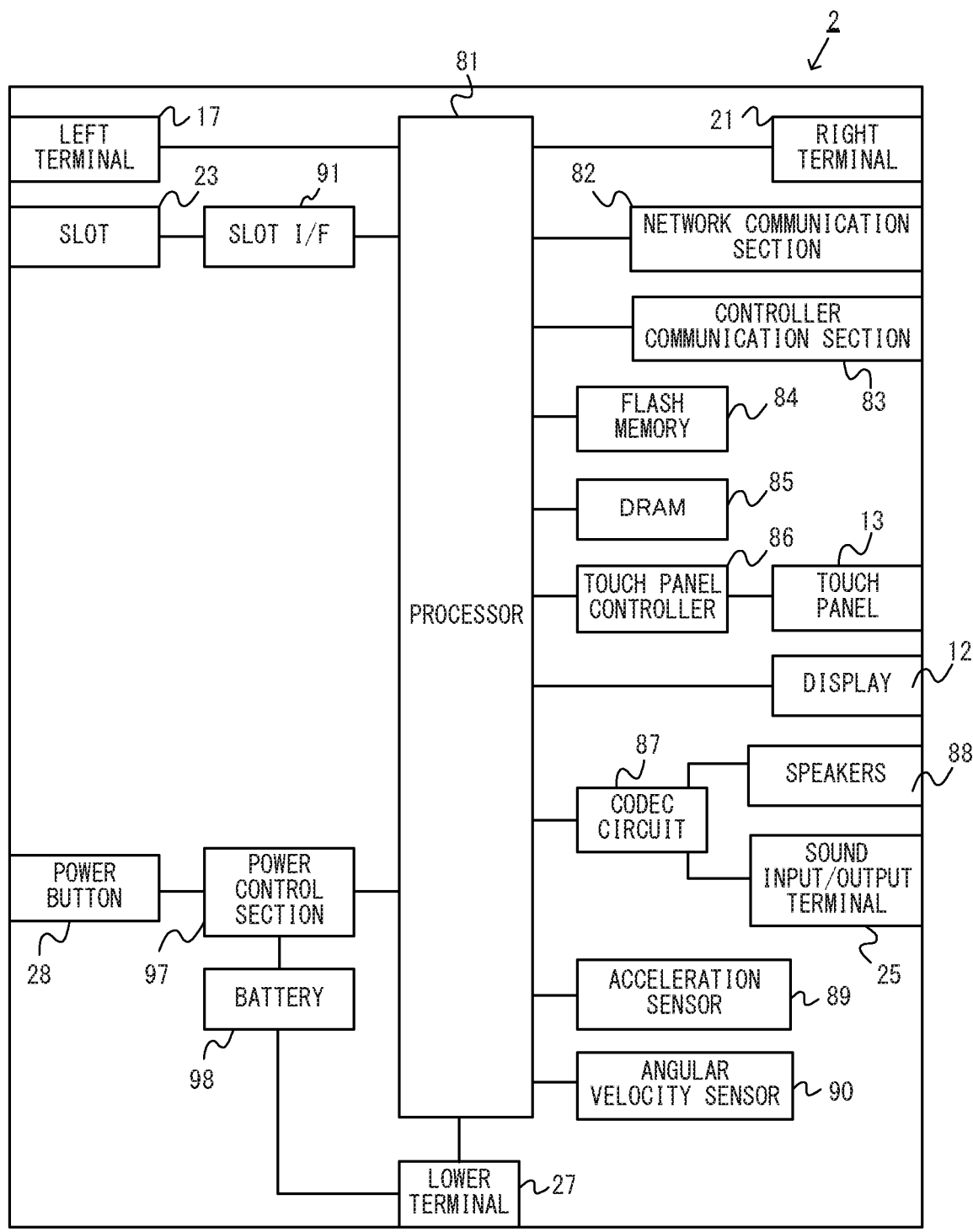
FIG. 6 is an example non-limiting block diagram showing an example of an internal configuration of a main body apparatus 2.

FIG. 6 is a block diagram showing an example of an internal configuration of the main body apparatus 2. The main body apparatus 2 includes components 81 to 91, 97, and 98 shown in FIG. 6 in addition to the components shown in FIG. 3. Some of the components 81 to 98 may be implemented as electronic parts on an electronic circuit board, which is accommodated in the housing 11.

The main body apparatus 2 includes a processor 81. The processor 81 is an information processing section for executing various types of information processing to be executed by the main body apparatus 2. For example, the CPU 81 may be composed only of a central processing unit (CPU), or may be a system-on-a-chip (SoC) having a plurality of functions such as a CPU function, a graphics processing unit (GPU) function, and the like. The processor 81 executes an information processing program (e.g., a game program) stored in a storage section (specifically, an internal storage medium such as a flash memory 84, an external storage medium that is loaded in the slot 23, or the like), thereby performing the various types of information processing.

The main body apparatus 2 includes a flash memory 84 and a dynamic random access memory (DRAM) 85 as examples of internal storage media built in the main body apparatus 2. The flash memory 84 and the DRAM 85 are coupled to the CPU 81. The flash memory 84 is mainly used to store various data (or programs) to be saved in the main body apparatus 2. The DRAM 85 is used to temporarily store various data used in information processing.

The main body apparatus 2 includes a slot interface (hereinafter abbreviated to "I/F") 91. The slot I/F 91 is coupled to the processor 81. The slot I/F 91 is coupled to the slot 23, and reads and writes data from and to the predetermined type of storage medium (e.g., a dedicated memory card) loaded in the slot 23, in accordance with instructions from the processor 81.

The processor 81 appropriately reads and writes data from and to the flash memory 84, the DRAM 85, and each of the above storage media, thereby performing the above information processing.

The main body apparatus 2 includes a network communication section 82. The network communication section 82 is coupled to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 located in a closed local network area, and the plurality of main body apparatuses 2 directly communicate with each other to exchange data.

The main body apparatus 2 includes a controller communication section 83. The controller communication section 83 is coupled to the processor 81. The controller communication section 83 wirelessly communicates with the left controller 3 and/or the right controller 4. The main body apparatus 2 may communicate with the left and right controllers 3 and 4 using any suitable communication method. In the exemplary embodiment, the controller communication section 83 performs communication with the left and right controllers 3 and 4 in accordance with the Bluetooth (registered trademark) standard.

The processor 81 is coupled to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left and right controllers 3 and 4. Further, when the unified apparatus obtained by attaching the left and right controllers 3 and 4 to the main body apparatus 2 or the main body apparatus 2 alone is attached to the cradle, the main body apparatus 2 can output data (e.g., image data or sound data) to a stationary monitor or the like via the cradle.

Here, the main body apparatus 2 can communicate with a plurality of left controllers 3 simultaneously (or in parallel). Further, the main body apparatus 2 can communicate with a plurality of right controllers 4 simultaneously (or in parallel). Thus, a plurality of users can simultaneously provide inputs to the main body apparatus 2, each using a set of the left and right controllers 3 and 4. As an example, a first user can provide an input to the main body apparatus 2 using a first set of the left and right controllers 3 and 4, and at the same time, a second user can provide an input to the main body apparatus 2 using a second set of the left and right controllers 3 and 4.

The main body apparatus 2 includes a touch panel controller 86 that is a circuit for controlling the touch panel 13. The touch panel controller 86 is coupled between the touch panel 13 and the processor 81. Based on a signal from the touch panel 13, the touch panel controller 86 generates, for example, data indicating a position where a touch input has been performed. Then, the touch panel controller 86 outputs the data to the processor 81.

Further, the display 12 is coupled to the processor 81. The processor 81 displays, on the display 12, a generated image (e.g., an image generated by executing the above information processing) and/or an externally acquired image.

The main body apparatus 2 includes a codec circuit 87 and speakers (specifically, a left speaker and a right speaker) 88. The codec circuit 87 is coupled to the speakers 88 and an audio input/output terminal 25 and also coupled to the processor 81. The codec circuit 87 is for controlling the input and output of audio data to and from the speakers 88 and the sound input/output terminal 25.

Further, the main body apparatus 2 includes an acceleration sensor 89. In the exemplary embodiment, the acceleration sensor 89 detects the magnitudes of accelerations along predetermined three axial (e.g., x-, y-, and z-axes shown in FIG. 1) directions. It should be noted that the acceleration sensor 89 may detect an acceleration along one axial direction or accelerations along two axial directions.

Further, the main body apparatus 2 includes an angular velocity sensor 90. In the exemplary embodiment, the angular velocity sensor 90 detects angular velocities about predetermined three axes (e.g., the x-, y-, and z-axes shown in FIG. 2). It should be noted that the angular velocity sensor 90 may detect an angular velocity about one axis or angular velocities about two axes.

The acceleration sensor 89 and the angular velocity sensor 90 are coupled to the processor 81, and the detection results of the acceleration sensor 89 and the angular velocity sensor 90 are output to the processor 81. Based on the detection results of the acceleration sensor 89 and the angular velocity sensor 90, the processor 81 can calculate information regarding a motion and/or orientation of the main body apparatus 2.

The main body apparatus 2 includes a power control section 97 and a battery 98. The power control section 97 is coupled to the battery 98 and the processor 81. Further, although not shown, the power control section 97 is coupled to components of the main body apparatus 2 (specifically, components that receive power supplied from the battery 98, the left terminal 17, and the right terminal 21). Based on a command from the processor 81, the power control section 97 controls the supply of power from the battery 98 to each of the above components.

Further, the battery 98 is coupled to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
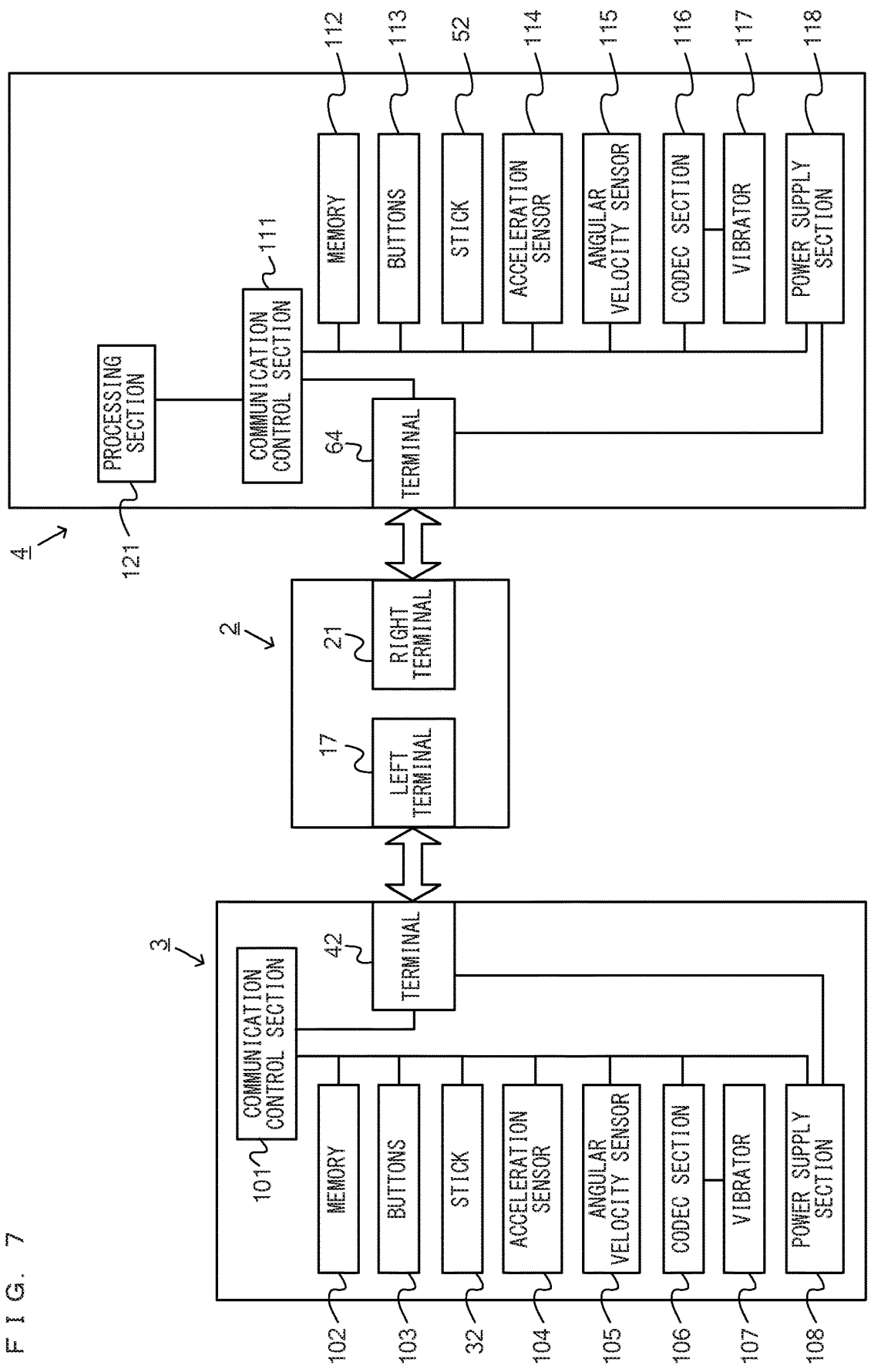
FIG. 7 is an example non-limiting block diagram showing examples of internal configurations of a main body apparatus 2, a left controller 3, and a right controller 4.

FIG. 7 is a block diagram showing examples of internal configurations of the main body apparatus 2, the left controller 3, and the right controller 4. It should be noted that the details of the internal configuration of the main body apparatus 2 are shown in FIG. 6 and therefore are not shown in FIG. 7.

The left controller 3 includes a communication control section 101 that communicates with the main body apparatus 2. As shown in FIG. 7, the communication control section 101 is coupled to components including the terminal 42. In the exemplary embodiment, the communication control section 101 can communicate with the main body apparatus 2 through both wired communication via the terminal 42 and wireless communication without via the terminal 42. The communication control section 101 controls a communication method which is performed by the left controller 3 with respect to the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. The buttons 103 and the analog stick 32 each output information regarding an operation performed on itself to the communication control section 101 repeatedly at appropriate timings.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., x-, y-, and z-axes shown in FIG. 5) directions. It should be noted that the acceleration sensor 104 may detect an acceleration along one axial direction or accelerations along two axial directions. Each of the acceleration sensor 104 and the angular velocity sensor 105 is coupled to the communication control section 101. Then, the detection results of the acceleration sensor 104 and the angular velocity sensor 105 are output to the communication control section 101 repeatedly at appropriate timings.

The communication control section 101 acquires information regarding an input (specifically, information regarding an operation or the detection result of a sensor) from each of input sections (specifically, the buttons 103, the analog stick 32, and the sensors 104 and 105). The communication control section 101 transmits operation data including the acquired information (or information acquired by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can acquire inputs provided to the left controller 3. That is, the main body apparatus 2 can determine operations performed on the buttons 103 and the analog stick 32 based on the operation data. Further, the main body apparatus 2 can calculate information regarding a motion and/or orientation of the left controller 3 based on the operation data (specifically, the detection results of the acceleration sensor 104 and the angular velocity sensor 105).

The left controller 3 includes a vibrator 107 for giving notification to the user by a vibration. In the exemplary embodiment, the vibrator 107 is controlled in accordance with a command from the main body apparatus 2. That is, the communication control section 101, when receiving the above command from the main body apparatus 2, drives the vibrator 107 in accordance with the received command. Here, the left controller 3 includes a codec section 106. The communication control section 101, when receiving the above command, outputs a control signal corresponding to the command to the codec section 106. The codec section 106 generates a drive signal for driving the vibrator 107 from the control signal received from the communication control section 101, and outputs the drive signal to the vibrator 107. The vibrator 107 is operated according to the drive signal.

More specifically, the vibrator 107 is a linear vibration motor. Unlike a typical motor that provides a rotary motion, the linear vibration motor is driven in a predetermined direction according to an input voltage and therefore can be vibrated at an amplitude and frequency corresponding to the waveform of the input voltage. In the exemplary embodiment, a vibration control signal transmitted from the main body apparatus 2 to the left controller 3 may be a digital signal representing a frequency and an amplitude every unit of time. In another exemplary embodiment, the main body apparatus 2 may transmit information indicating the waveform itself. However, if only the amplitude and the frequency are transmitted, the amount of communication data can be reduced. In order to further reduce the amount of data, only the differences between the current values of the amplitude and the frequency at each time and the previous values may be transmitted, instead of the current values themselves. In this case, the codec section 106 converts the digital signal indicating the values of the amplitude and the frequency acquired from the communication control section 101 into an analog voltage waveform, and inputs a voltage to the vibrator 107 according to the resulting waveform, thereby driving the vibrator 107. Thus, the main body apparatus 2 changes the amplitude and frequency to be transmitted every unit of time, and thereby can control the amplitude and frequency with which the vibrator 107 is vibrated at each time. It should be noted that two or more different sets of amplitudes and frequencies indicating two or more waveforms may be transmitted from the main body apparatus 2 to the left controller 3, instead of a single set of amplitudes and frequencies indicating a single waveform. In this case, the codec section 106 combines waveforms indicated by the plurality of sets of amplitudes and frequencies thus received, and thereby can generate a single voltage waveform for controlling the vibrator 107.

The left controller 3 includes a power supply section 108. In the exemplary embodiment, the power supply section 108 includes a battery and a power control circuit. Although not shown, the power control circuit is coupled to the battery and also coupled to components of the left controller 3 (specifically, components that receive power supplied from the battery).

As shown in FIG. 7, the right controller 4 includes a communication control section 111 that communicates with the main body apparatus 2. Further, the right controller 4 includes a memory 112 that is coupled to the communication control section 111. The communication control section 111 is coupled to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication without via the terminal 64 (specifically, communication compliant with the Bluetooth (registered trademark) standard). The communication control section 111 controls a communication method that is performed by the right controller 4 with respect to the main body apparatus 2.

The right controller 4 includes input sections similar to those of the left controller 3. Specifically, the right controller 4 includes buttons 113, an analog stick 52, and inertial sensors (an acceleration sensor 114 and an angular velocity sensor 115). These input sections have functions similar to those of the input sections of the left controller 3 and operate in manners similar to those of the input sections of the left controller 3.

Further, the right controller 4 includes a vibrator 117 and a codec section 116. The vibrator 117 and the codec section 116 operate in manners similar to those of the vibrator 107 and the codec section 106, respectively, of the left controller 3. That is, the communication control section 111 operates the vibrator 117 using the codec section 116 in accordance with a command from the main body apparatus 2.

The right controller 4 includes a processing section 121. The processing section 121 is coupled to the communication control section 111.

The right controller 4 includes a power supply section 118. The power supply section 118 has a function similar to that of the power supply section 108 of the left controller 3, and operates in a similar manner.

Next, a game that is played in the game system 1 according to the exemplary embodiment will be described. In the exemplary embodiment, a player plays the game with its left and right hands holding the left and right controllers 3 and 4, respectively. It should be noted that the game may be played with the left and right controllers 3 and 4 being detached from the main body apparatus 2. Alternatively, as shown in FIG. 1, the game may be played with the left and right controllers 3 and 4 being attached to the main body apparatus 2.

Figure 8:
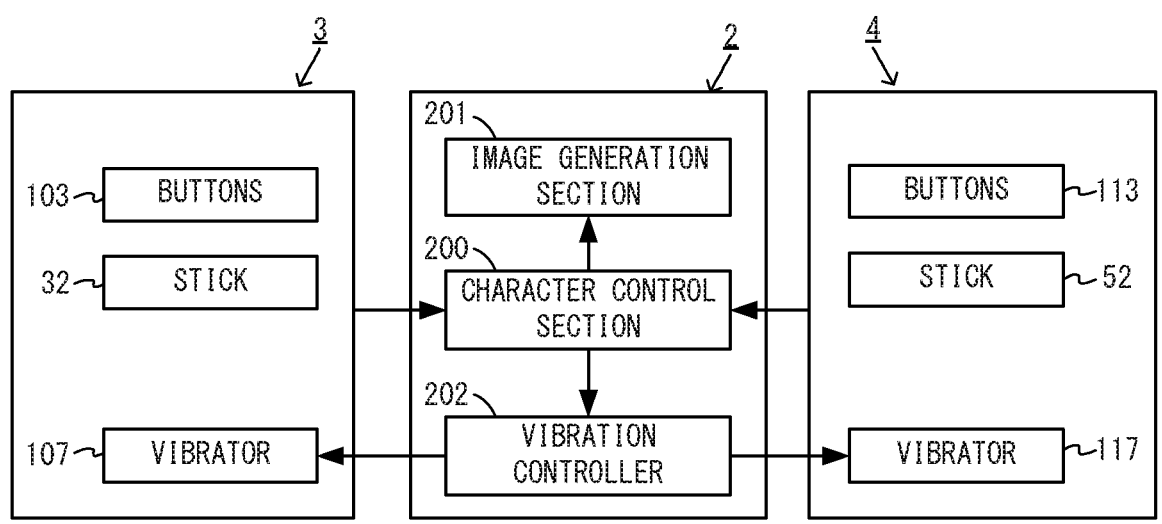
FIG. 8 is an example non-limiting diagram showing an example of a functional configuration of a game system 1 according to the present exemplary embodiment.

FIG. 8 is a diagram showing an example of a functional configuration of the game system 1 according to the exemplary embodiment. As shown in FIG. 8, the main body apparatus 2 includes a character control section 200, an image generation section 201, and a vibration controller 202. The processor 81 of the main body apparatus 2 executes a predetermined game program to function as the character control section 200, the image generation section 201, and the vibration controller 202. The predetermined game program may, for example, be stored in an external storage medium that is loaded in the slot 23, or in the flash memory 84, or may be externally acquired via a network.

The character control section 200 acquires operation data corresponding to the player's operation performed on each of the buttons 103 and 113 and the analog sticks (hereinafter simply referred to as "sticks") 32 and 52 of the left and right controllers 3 and 4. Based on the acquired operation data, the character control section 200 controls an operation object (a player character). For example, the character control section 200 moves a player character in a virtual space, based on an operation performed on the stick 32 of the left controller 3. Further, the character control section 200 causes a player character to jump in the virtual space according to an operation performed on any (e.g., the A-button 53) of the buttons 113 of the right controller 4, for example.

The image generation section 201 generates an image of the virtual space that contains an operation object operated by the player, using a virtual camera provided in the virtual space. The image generation section 201 generates an image of the virtual space at predetermined time intervals (e.g., intervals of 1/60 sec). The images generated by the image generation section 201 are output to the display 12, which displays the images. Because the image generation section 201 generates an image at predetermined time intervals, the display 12 displays an animation in which the player character moves and jumps. It should be noted that images generated by the image generation section 201 may be displayed on a display device (e.g., a television set) that is different from the display 12.

The vibration controller 202 generates vibration control signals for controlling vibrations of the vibrators 107 and 117 of the left and right controllers 3 and 4. Thereafter, the vibration controller 202 outputs the generated vibration control signals to the left and right controllers 3 and 4. The vibrators 107 and 117 of the left and right controllers 3 and 4 vibrate with strengths based on the vibration control signals.

Specifically, the vibration controller 202 generates a vibration control signal when the player character, which is controlled by the character control section 200, is in contact with a ground object in the virtual space. Meanwhile, the vibration controller 202 does not generate a vibration control signal when the player character is not in contact with a ground object in the virtual space.

Figure 9:
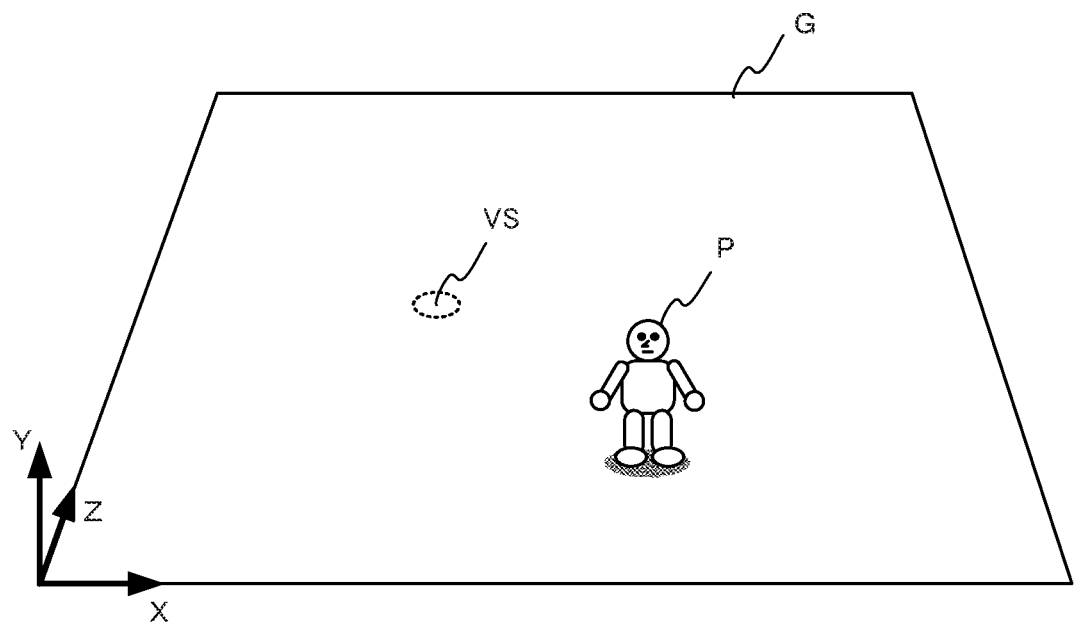
FIG. 9 is an example non-limiting diagram showing an example of a virtual space in a case where a game according to the present exemplary embodiment is performed.
Figure 10:
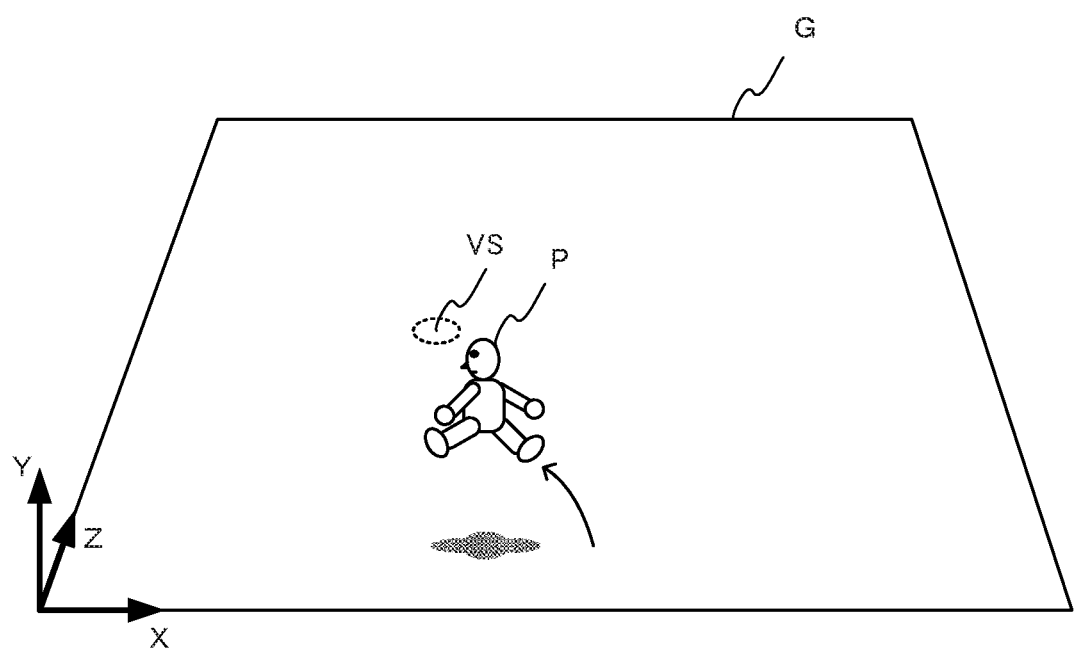
FIG. 10 is an example non-limiting diagram showing an example of a situation in which a player character P performs a jumping motion in the virtual space.

FIG. 9 is a diagram showing an example of the virtual space in a case where the game of the exemplary embodiment is performed. FIG. 10 is a diagram showing an example of a situation in which a player character P performs a jumping motion in the virtual space.

As shown in FIG. 9, an XYZ coordinate system is specified in the virtual space. For example, the X-axis extends in the rightward direction of the virtual space, the Y-axis extends in the height direction of the virtual space, and the Z-axis extends in the depth direction of the virtual space.

Provided in the virtual space are the player character P, a ground object G, and a vibration object VS as a vibration source. Further, a virtual camera is provided in the virtual space. The virtual camera is fixed to a location where the virtual camera views the entire ground object G obliquely from above. When the game according to the exemplary embodiment is being played, an image as shown in FIG. 9 may be displayed on the display 12 (or other display devices).

The ground object G is, for example, a plane that is parallel to the XZ plane. It should be noted that the ground object G may be a curved surface. Further, the ground object G may undulate. Other objects may be provided on the ground object G.

The player character P moves in the virtual space by walking or running on the ground object G, based on an operation performed on the stick 32 of the left controller 3. Further, as shown in FIG. 10, the player character P performs a jumping motion in the virtual space according to an operation performed on the A-button 53 of the right controller 4. In the virtual space, virtual gravity pointing in the negative direction of the Y-axis exists. When the player character P performs a jumping motion on the ground object G, the player character P moves upward in the virtual space to be temporarily away from the ground object G, and after a predetermined time has elapsed, drops on the ground object G again due to the virtual gravity exerted thereon.

The vibration object VS generates a vibration. The vibration object VS is buried under the ground object G Therefore, the vibration object VS is not displayed on the screen of the display 12. In the game according to the exemplary embodiment, it is assumed that the vibration object VS, which is always virtually vibrating, causes the ground object G to virtually vibrate. The player perceives that virtual vibration through the left and right controllers 3 and 4.

Specifically, when the player character P is in contact with the ground object G, the vibrators 107 and 117 of the left and right controllers 3 and 4 vibrates. As a result, the player perceives a virtual vibration of the vibration object VS through both hands.

In the game according to the exemplary embodiment, the vibration strengths of the vibrators 107 and 117 of the left and right controllers 3 and 4 are controlled according to a positional relationship between the player character P and the vibration object VS. For example, when the player character P is in contact with the ground object G, and the vibration object VS is located to the left of the player character P, the vibrators 107 and 117 vibrate such that the left controller 3 vibrates more strongly than the right controller 4. Further, when the player character P is in contact with the ground object G, and the vibration object VS is located to the right of the player character P, the vibrators 107 and 117 vibrate such that the right controller 4 vibrates more strongly than the left controller 3. Further, when the player character P is located on a straight line passing through the vibration object VS and extends parallel to the Z-axis (i.e., the vibration object VS is not off to the left or right of the player character P), the left and right controllers 3 and 4 vibrate with the same strength.

Further, the vibration strengths of the vibrators 107 and 117 of the left and right controllers 3 and 4 are controlled according to a distance between the player character P and the vibration object VS. Specifically, the vibration strengths of the vibrators 107 and 117 are increased with a decrease in the distance between the player character P and the vibration object VS. When the player character P is located directly above the vibration object VS, the vibration strengths of the vibrators 107 and 117 are greatest, and are equal to each other.

The player estimates the location of the vibration object VS, based on the vibrations of the left and right controllers 3 and 4 that the player feels. For example, when the left controller 3 vibrates more strongly than the right controller 4, the player can estimate that the vibration object VS is buried to the left of the player character P. Further, when the vibrations of the left and right controllers 3 and 4 are weak, the player can estimate that the vibration object VS is distant from the player character P.

Thus, the player estimates the location of the vibration object VS, based on the vibration strengths of the left and right controllers 3 and 4 and the ratio thereof, moves the player character P to the estimated location, and performs a specific operation (e.g., an operation of pressing down the A-button 53 and a ZR button 61). When the vibration object VS is present below the estimated location, the player character P can get a predetermined item.

Here, when the player presses down, for example, the A-button 53, so that the player character P performs a jumping motion in the virtual space, the player character P is temporarily away from the ground object G While the player character P is temporarily away from the ground object G, none of the vibrators 107 and 117 of the left and right controllers 3 and 4 vibrates.

Figure 11:
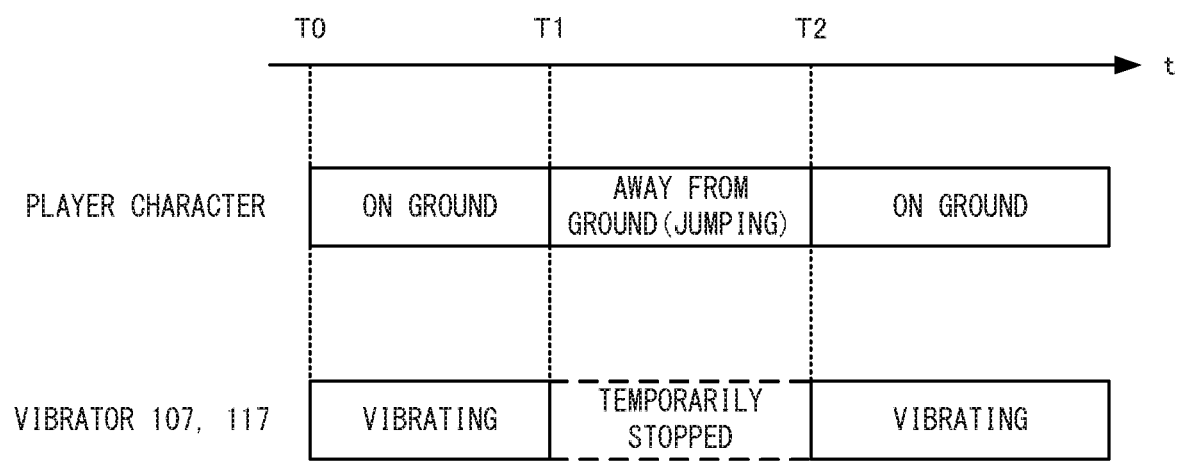
FIG. 11 is an example non-limiting diagram showing an example of an image that is displayed when the player character 130 jumps toward the wall object 136 in a case where the virtual camera is located at a right rear of the player character 130.

FIG. 11 is a diagram showing an example of timings of a jumping motion of the player character P and vibrations of the vibrators 107 and 117.

As shown in FIG. 11, when the player character P is in contact with the ground object G without performing a jumping motion, the vibrators 107 and 117 vibrate (from time T0 to time T1). It should be noted that the vibration strengths (amplitudes) of the vibrators 107 and 117 vary according to the distance between the vibration object VS and the player character P. The vibration strengths of the vibrators 107 and 117 are increased with a decrease in the distance between the vibration object VS and the player character P. Further, even when the player character P is in contact with the ground object G, then if the player character P is away from the vibration object VS by at least a predetermined distance, none of the vibrators 107 and 117 vibrates.

Here, it is assumed that, at time T1, the player character P performs a jumping motion according to an operation performed by the player. When the player character P performs a jumping motion, the player character P is temporarily not in contact with the ground object G (from time T1 to time T2). During this period of time from T1 to T2, the vibrations of the vibrators 107 and 117 are stopped.

When, at time T2, the player character P comes into contact with the ground object G again, the vibrators 107 and 117 resume vibrating. After time T2, the player character P continues to be in contact with the ground object G, and therefore, the vibrators 107 and 117 continues to vibrate as long as the player character P is not away from the vibration object VS by at least the predetermined distance.

Thus, in the exemplary embodiment, when the player character P performs a jumping motion, so that the player character P is temporarily away from the ground object G, the vibrations of the left and right controllers 3 and 4 are temporarily stopped. As a result, the player can recognize that the ground object G (specifically, the vibration object VS buried under the ground object G) is vibrating.

It should be noted that a vibration caused by the vibration object VS (hereinafter referred to as a "first vibration") and a vibration caused by an object other than the vibration object VS may occur simultaneously. For example, when the player character P is holding or carrying an item object that vibrates, or is traveling on or in a vehicle object that vibrates, a vibration caused by the item or vehicle object (hereinafter referred to as a "second vibration") occurs. When the player character P is holding or carrying an item object that vibrates, or is traveling on or in a vehicle object that vibrates, then if the player character P or the vehicle object is in contact with the ground object G, the first and second vibrations occur simultenously.

When the first and second vibrations occur simultaneously, a combined vibration produced by combining the first and second vibrations is perceived by the player. In this case, when the player character P performs a jumping motion, the player character P is not in contact with the ground object G, and therefore, the first vibration is temporarily stopped. Meanwhile, even when the player character P performs a jumping motion, so that the player character P is not in contact with the ground object G, the item or vehicle object is in contact with the player character P, and therefore, the second vibration is continued. Thus, when the player character P is in contact with the ground object G, the player perceives a combined vibration produced by combining the first and second vibrations, and while the player character P is performing a jumping motion, the player perceives only the second vibration. When the player character P comes into contact with the ground object G again, the player will perceive the combined vibration.

It should be noted that a plurality of vibrations may be combined in accordance with the superposition principle of wave, for example. Further, a plurality of vibrations may be combined using other techniques. For example, in a case where the two vibration waveforms V1 and V2 are combined, the amplitude value of the combined waveform may be calculated by adding the amplitude values of the vibration waveforms V1 and V2 together at that moment. Further, the frequency of the combined waveform may be calculated by averaging the frequencies of the vibration waveforms V1 and V2 at that moment.

Further, a plurality of vibrations may be combined using one of a plurality of waveforms that has a greatest amplitude. For example, in a case where the two vibration waveforms V1 and V2 are combined, if the amplitude value of the vibration waveform V1 is greater than the amplitude value of the vibration waveform V2 at that moment, the combined waveform may be the vibration waveform V1. Further, when the amplitude value of the vibration waveform V2 is greater than the amplitude value of the vibration waveform V1 at another moment, the combined waveform may be the vibration waveform V2.

Figure 12:
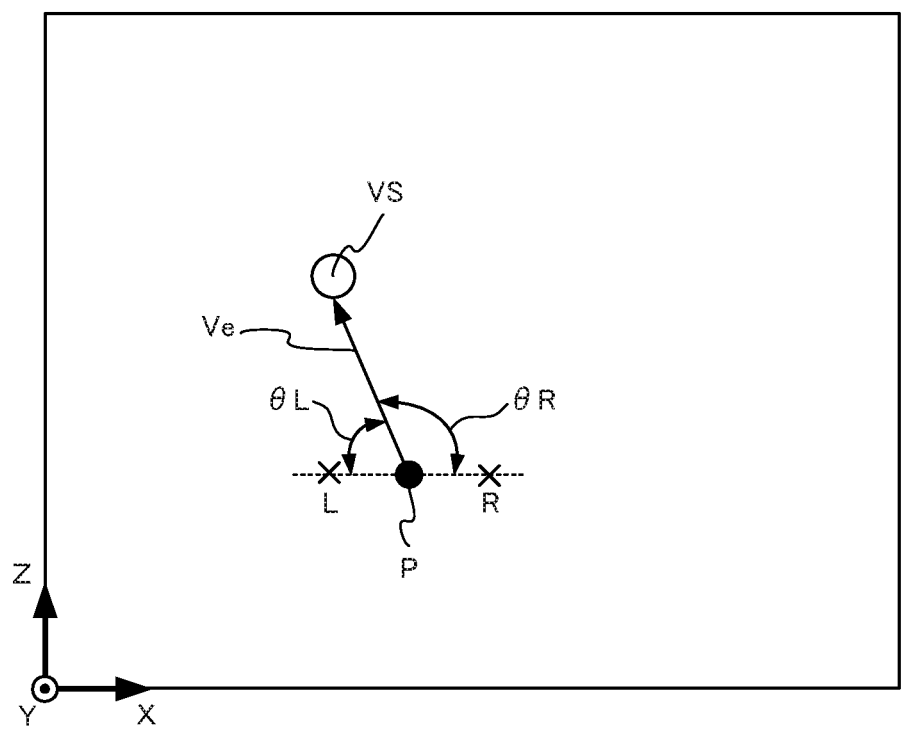
FIG. 12 is an example non-limiting diagram for describing control of vibrations that is performed according to a positional relationship between a player character P and a vibration object VS.

Next, the control of the vibrators 107 and 117 of the left and right controllers 3 and 4 will be specifically described. FIG. 12 is a diagram for describing the control of the vibrations that is performed according to the positional relationship between the player character P and the vibration object VS. FIG. 12 shows the virtual space as viewed from above.

The main body apparatus 2 previously stores vibration pattern data for the vibration object VS, and calculates a frequency and an amplitude, based on the vibration pattern data. By adjusting the amplitude based on the vibration pattern data, the vibration strengths of the vibrators 107 and 117 are calculated.

Specifically, as shown in FIG. 12, initially, a vector Ve pointing from the location of the player character P to the location of the vibration object VS is calculated, and the magnitude of the vector Ve (the distance between the player character P and the vibration object VS) is calculated. By adjusting the amplitude based on the vibration pattern data on the basis of the distance between the player character P and the vibration object VS, a "reference vibration strength (amplitude)" of the vibrators 107 and 117 is calculated.

For example, the "reference vibration strength" is determined by multiplying the amplitude based on the vibration pattern data by a coefficient corresponding to the distance between the player character P and the vibration object VS. The "reference vibration strength" is determined within the range of, for example, 0 to 1. The "reference vibration strength" increases with a decrease in the distance between the player character P and the vibration object VS. For example, the reference vibration strength may decrease in a manner represented by a linear function as the distance increases. Further, the reference vibration strength may be inversely proportional to the distance. Further, the reference vibration strength may be fixed in a case where the distance is within a predetermined range, and may decrease with an increase in the distance in a case where the distance is greater than or equal to a predetermined distance. The relationship between the distance and the reference vibration strength may be determined based on any other suitable functions.

After the "reference vibration strength" has been determined, the ratio of the vibration strengths of the vibrators 107 and 117 is determined. Specifically, in the virtual space, reference points L and R are set on a straight line that passes through the location of the player character P and extends parallel to the X-axis. An angle θL between a vector pointing from the location of the player character P toward the reference point L, and the vector Ve, is calculated. Based on the angle θL, a damping coefficient CL is calculated. The damping coefficient CL is calculated within the range of, for example, 0 to 1. For example, the damping coefficient CL is set to "1" in a case where the angle θL is within the range of 0° to 90°, and is set to be smaller than "1" in a case where the angle θL exceeds 90°. The damping coefficient CL may be set to "0" in a case where the angle θL is 180°. Further, for example, as the angle θL changes from 0° to 180°, the damping coefficient CL may linearly change from 1 to 0. By multiplying the "reference vibration strength" determined according to the distance between the player character P and the vibration object VS by the damping coefficient CL calculated based on the angle θL, the vibration strength (amplitude) of the vibrator 107 is determined.

The same applies to the vibrator 117 of the right controller 4. The vibration strength of the vibrator 117 of the right controller 4 is determined based on an angle θR between a vector pointing from the location of the player character P toward the reference point R, and the vector Ve. Specifically, by calculating a damping coefficient CR (e.g., within the range of 0 to 1) based on the angle θR, and multiplying the "reference vibration strength" determined according to the distance between the player character P and the vibration object VS by the damping coefficient CR, the vibration strength (amplitude) of the vibrator 117 is determined.

For example, when the angle θL is equal to the angle θR (i.e., both are 90°), the vibrators 107 and 117 vibrate with the same strength. Further, when the angle θL is smaller than 90° and the angle θR is greater than 90°, the vibrator 107 vibrates more strongly than the vibrator 117.

It should be noted that, in the above exemplary embodiment, it is assumed that the virtual camera is fixed in the virtual space, and alternatively, the location and orientation of the virtual camera may be changed according to an operation performed by the player, or may be automatically changed by a program. In this case, the angles θL and θR may be changed according to the orientation of the virtual camera. For example, in a case where a fixed camera coordinate system may be set for the virtual camera, and the Xc axis of the camera coordinate system is set as the rightward direction of the virtual camera, the reference points L and R may be set on a straight line that passes through the location of the player character P and extends parallel to the Xc axis. The angles θL and θR may be calculated based on the reference points L and R, and the vibration strengths of the vibrators 107 and 117 may be calculated.

A first vibration control signal containing the frequency and vibration strength (amplitude) of the vibrator 107 thus calculated is generated and output to the left controller 3. Similarly, a second vibration control signal containing the frequency and vibration strength (amplitude) of the vibrator 117 thus calculated is generated and output to the right controller 4.

When the player character P is in contact with the ground object G, the first and second vibration control signals are generated and output to the left and right controllers 3 and 4, respectively, at predetermined time intervals (e.g., intervals of 5 msec). As a result, the vibrators 107 and 117 vibrate with a waveform corresponding to vibration pattern data, and with strengths corresponding to the positional relationship between the player character P and the vibration object VS. While the player character P is in contact with the ground object G, the playback of a vibration waveform based on vibration pattern data is repeatedly performed.

Meanwhile, when the player character P performs a jumping motion, so that the player character P is temporarily not in contact with the ground object G, the generation and output of the vibration control signals are temporarily stopped. Therefore, none of the vibrators 107 and 117 vibrates. Even in the middle of the playback of a vibration waveform based on the previously stored vibration pattern data, when the player character P leaves the ground object G, the generation and output of the vibration control signals are stopped. When the player character P comes into contact with the ground object G again, the generation and output of the vibration control signals are resumed. In this case, the vibration pattern data (file) may be played back from the beginning thereof, or from a partway point (a point where the playback is temporarily stopped).

As described above, in the exemplary embodiment, when the player character P performs a jumping motion, so that the ground object G is temporarily not in contact with the ground object G, the generation and output of the first and second vibration control signals are temporarily stopped. That is, a vibration that occurs due to contact with the ground object G (a vibration caused by the vibration object VS) is temporarily stopped. As a result, the left and right controllers 3 and 4 temporarily stop vibrating. Therefore, by causing the player character P to perform a jumping motion, the player can easily recognize that the ground object G is vibrating. Even when a vibration caused by the vibration object VS and another vibration are simultaneously occurring, then if the player character P performs a jumping motion, a vibration caused by the vibration object VS is temporarily stopped, and therefore, the player can feel a change in vibration. Therefore, by causing the player character P to perform a jumping motion, the player can easily recognize that the ground object G is vibrating. Further, based on the ratio of the vibration strengths of the left and right controllers 3 and 4, the player can recognize where a vibration source is located in the virtual space.

(Details of Process)

Figure 13:
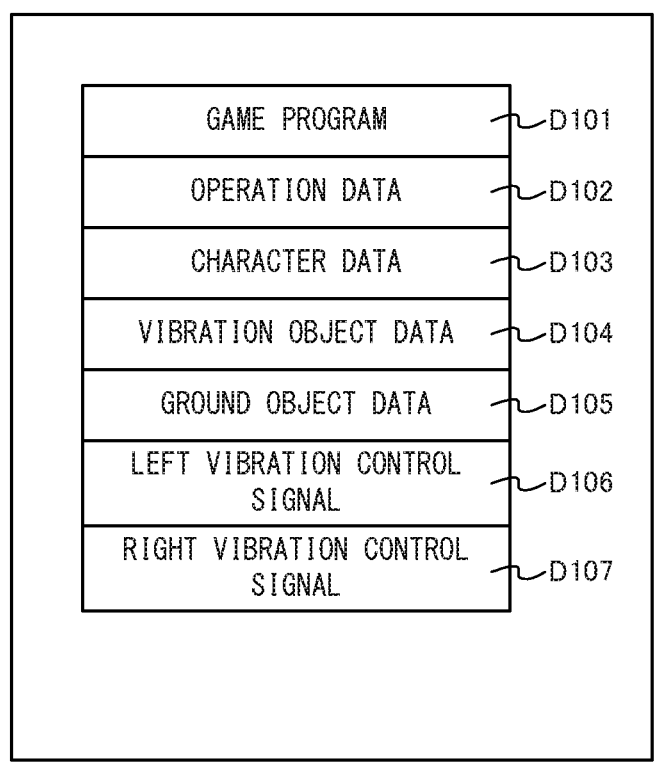
FIG. 13 is an example non-limiting diagram showing an example of data stored in a main body apparatus 2.

Next, a process performed in the main body apparatus 2 of the game system 1 will be performed in detail. Firstly, data stored in the main body apparatus 2 will be described. Afterwards, a description of information processing performed in the main body apparatus 2 will be provided. FIG. 13 is a diagram showing an example of data stored in the main body apparatus 2.

As shown in FIG. 13, the main body apparatus 2 stores a game program D101, operation data D102, character data D103, vibration object data D104, ground object data D105, a left vibration control signal D106, and a right vibration control signal D107. It should be noted that the main body apparatus 2 stores various other data and programs in addition to those shown in FIG. 13.

The game program D101 is for executing the above game.

The operation data D102 corresponds to operations performed on the left and right controllers 3 and 4, and is transmitted from the left and right controllers 3 and 4. In the exemplary embodiment, the main body apparatus 2 communicates with the left and right controllers 3 and 4 at predetermined time intervals (e.g., intervals of 1/200 sec). In the communication, the left and right controllers 3 and 4 transmit the operation data D102 to the main body apparatus 2. Further, in the communication, the left and right vibration control signals D106 and D107 are transmitted from the main body apparatus 2 to the left and right controllers 3 and 4, respectively.

The character data D103 contains information related to the location, orientation, movement speed, movement direction, jump direction, jump speed, etc., of the player character P.

The vibration object data D104 contains information related to the location of the vibration object VS in the virtual space. Further, the vibration object data D104 contains vibration pattern data (data representing a vibration waveform) corresponding to the vibration object VS.

The ground object data D105 is data (position data, polygon data, texture data, etc.) related to the ground object G provided in the virtual space.

The left vibration control signal D106 is data indicating the first vibration control signal for causing the vibrator 107 of the left controller 3 to vibrate, and contains a frequency and an amplitude. The right vibration control signal D107 is data indicating the second vibration control signal for causing the vibrator 117 of the right controller 4 to vibrate, and contains a frequency and an amplitude.

Next, a process performed in the main body apparatus 2 will be described in detail.

Figure 14:
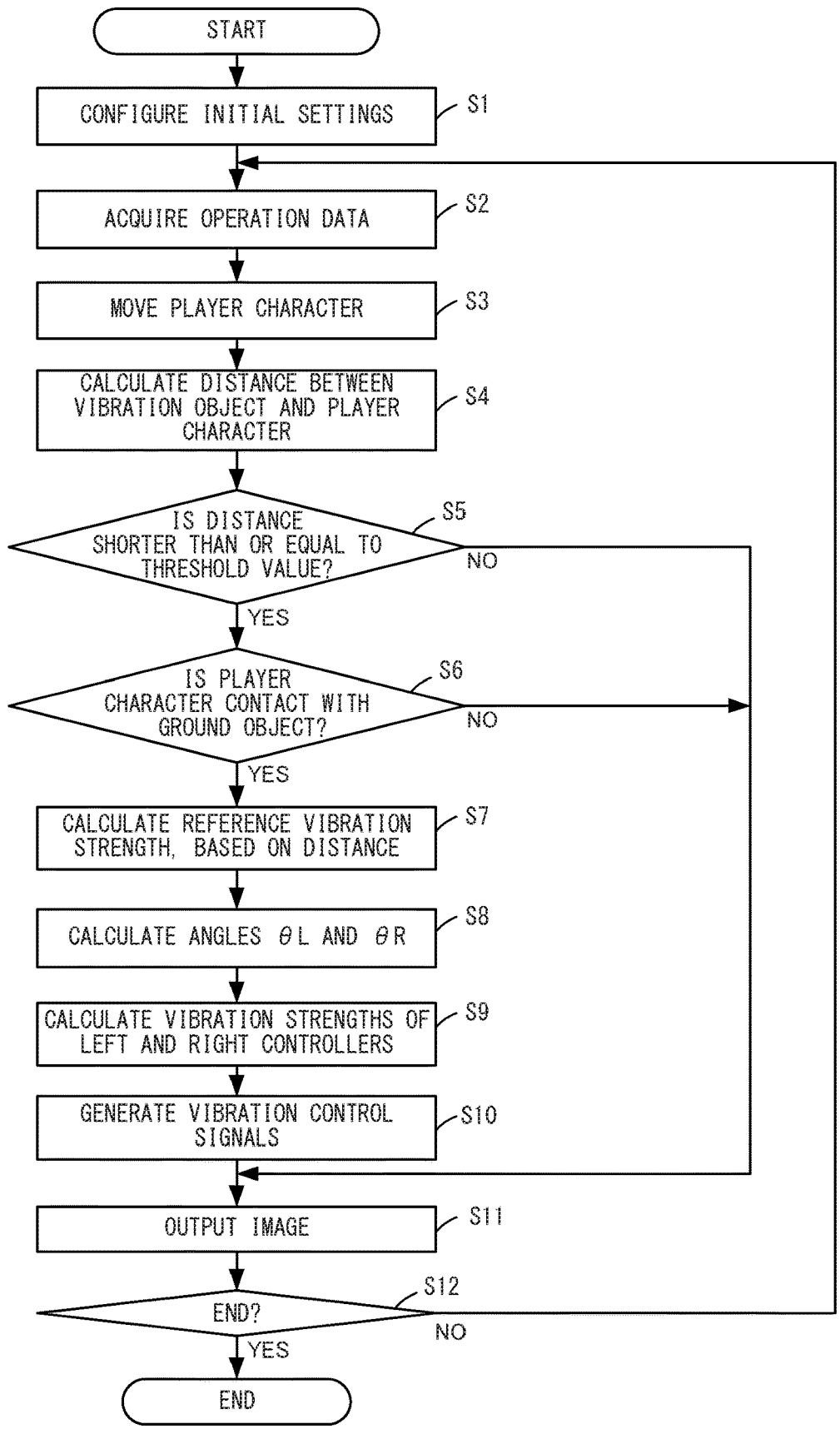
FIG. 14 is an example non-limiting flowchart showing a detailed process that is performed in a main body apparatus 2 when a game according to the present exemplary embodiment is executed.

FIG. 14 is a flowchart showing a detailed process that is performed in the main body apparatus 2 when the game according to the exemplary embodiment is executed. The process of FIG. 14 is performed by the processor 81 of the main body apparatus 2 executing the game program D101 (information processing program).

As shown in FIG. 14, initially, the processor 81 of the main body apparatus 2 (hereinafter simply referred to as "the main body apparatus 2") configures initial settings (step S1). Specifically, the main body apparatus 2 sets the virtual space, and provides the ground object G, the vibration object VS, and the player character P in the virtual space. Further, the main body apparatus 2 sets the virtual camera in the virtual space at a predetermined location. After step S1, the main body apparatus 2 repeatedly executes steps S2 to S12 at intervals of, for example, 1/60 sec (called a one-frame time).

Following step S1, the main body apparatus 2 acquires operation data transmitted from the left and right controllers 3 and 4 (step S2). Specifically, the left and right controllers 3 and 4 transmit operation data corresponding to an operation to the main body apparatus 2 at predetermined time intervals (e.g., intervals of 1/200 sec). The main body apparatus 2 temporarily stores the operation data received from the left and right controllers 3 and 4 in the DRAM 85. In step S2, the main body apparatus 2 acquires the operation data stored in the DRAM 85.

Next, the main body apparatus 2 causes the player character P to perform a motion in the virtual space, based on the acquired operation data (step S3). For example, when the stick 32 of the left controller 3 is operated, the main body apparatus 2 causes the player character P to move in the virtual space in a direction corresponding to the operation direction of the stick 32, and updates the location and orientation of the player character P. Further, for example, when an operation button (e.g., the A-button 53) of the right controller 4 is pressed down, the main body apparatus 2 causes the player character P to jump in the virtual space, and updates the location and orientation of the player character P.

Specifically, virtual gravity exists in the virtual space, and the main body apparatus 2 updates the location of the player character P, based on the virtual gravity and a motion state of the player character P. When the player character P does not perform a jumping motion, the Y-coordinate value of the player character P is "0." When the player character P performs a jumping motion, the main body apparatus 2 calculates the location (the X-coordinate value, the Y-coordinate value, the Z-coordinate value) of the player character P in the current frame, based on the jump speed, the jump direction, and the virtual gravity. It should be noted that the player character P may perform a plurality of types of jumping motions. The jump speed and the jump direction may vary according to the jumping motion type, and a time it takes for the player character P to leave the ground object G and drop on the ground object G again may vary. The main body apparatus 2 stores the updated location and orientation of the player character P as the character data D103.

Following step S3, the main body apparatus 2 calculates the distance between the vibration object VS and the player character P (step S4). Next, the main body apparatus 2 determines whether or not the distance calculated in step S4 is shorter than or equal to a predetermined threshold (step S5).

If the main body apparatus 2 determines that the distance is shorter than or equal to the predetermined threshold (step S5: YES), the main body apparatus 2 determines whether or not the player character P is in contact with the ground object G (step S6). Specifically, the main body apparatus 2 determines whether or not a polygon of the ground object G collides with a polygon of the player character P, based on the locations of the player character P and the ground object G It should be noted that the main body apparatus 2 may determine whether or not the player character P is in contact with the ground object G, based on the location in the Y-axis direction of the player character P.

It should be noted that even when the player character P performs a jumping motion, then if there is an object that blocks the jumping motion, for example, above the head of the player character P, the player character P does not leave the ground object G. In this case, in step S6, the main body apparatus 2 determines that the player character P is in contact with the ground object G.

If the main body apparatus 2 determines that the player character P is in contact with the ground object G (step S6: YES), the main body apparatus 2 calculates the reference vibration strength, based on the distance calculated in step S4 (step S7). Specifically, the main body apparatus 2 calculates a frequency F and an amplitude A, based on vibration pattern data corresponding to the vibration object VS. Thereafter, the main body apparatus 2 reduces the calculated amplitude A according to the distance calculated in step S4, to calculate a reference vibration strength A'.

Following step S7, the main body apparatus 2 calculates the angles θL and OR (step S8). Specifically, the main body apparatus 2 calculates the angle θL between a vector pointing in the negative direction of the X-axis of the virtual space and the vector Ve pointing from the player character P toward the vibration object VS. Further, the main body apparatus 2 calculates the angle θR between a vector pointing in the positive direction of the X-axis of the virtual space and the vector Ve pointing from the player character P toward the vibration object VS.

Next, the main body apparatus 2 calculates the vibration strengths of the left and right controllers 3 and 4 (step S9). Specifically, the main body apparatus 2 calculates the amplitude of the vibrator 107 of the left controller 3, based on the reference vibration strength calculated in step S7 and the angle θL calculated in step S8. Further, the main body apparatus 2 calculates the amplitude of the vibrator 117 of the right controller 4, based on the reference vibration strength calculated in step S7 and the angle θR calculated in step S8.

Next, the main body apparatus 2 generates vibration control signals that are to be output to the left and right controllers 3 and 4 (step S10). Specifically, the main body apparatus 2 generates a first vibration control signal containing the frequency F calculated in step S7 and the amplitude of the vibrator 107 calculated in step S9, and stores the first vibration control signal as the left vibration control signal D106. Further, the main body apparatus 2 generates a second vibration control signal containing the frequency F calculated in step S7 and the amplitude of the vibrator 117 calculated in step S9, and stores the second vibration control signal as the right vibration control signal D107. The left and right vibration control signals D106 and D107 are output from the main body apparatus 2 to the left and right controllers 3 and 4, respectively, in communication between the main body apparatus 2 and the controllers (3 and 4).

If step S10 has been performed, the determination result in step S5 is negative ("NO"), or the determination result in step S6 is negative ("NO"), the main body apparatus 2 generates an image of the virtual space using the virtual camera, and outputs the generated image to the display 12 (step S11).

Thus, if the main body apparatus 2 determines that the player character P is not in contact with the ground object G (step S6: NO), the main body apparatus 2 does not perform any of steps S7 to S10. Therefore, while the player character P is not in contact with the ground object G, none of the first and second vibration control signals is generated, and none of the left and right controllers 3 and 4 vibrates.

Following step S11, the main body apparatus 2 determines whether or not to end the process of FIG. 14 (step S12). For example, if the location of the vibration object VS coincides with the location of the player character P, then when the player performs a specific operation, the main body apparatus 2 displays an image showing that the player character P has acquired a predetermined item, and ends the process of FIG. 14. If, in step S12, the main body apparatus 2 determines not to end the process of FIG. 14, the main body apparatus 2 executes step S2 again. The description of FIG. 14 is ended.

It should be noted that the steps shown in FIG. 14 are merely illustrative. For example, the steps may be executed in a different order, other steps may be added, or a portion of the steps may be removed. Further, the numerical values used in the steps are merely illustrative. Other values may be used.

As described above, in the exemplary embodiment, when an operation object (player character) that is operated by a player (user) is in contact with a predetermined surface (ground object) in a virtual space, a vibrator (the vibrators 107 and 117) is caused to vibrate. When the operation object performs a motion of leaving the predetermined surface (jumping motion) according to an operation performed by the player, so that the operation object is away from the predetermined surface due to the motion, the vibrator is not caused to vibrate.

In the exemplary embodiment, it is assumed that the predetermined surface is always vibrating, and therefore, when the operation object is temporarily away from the predetermined surface, the vibration of the vibrator is stopped. Therefore, the player can easily recognize that the contact with the predetermined surface causes the vibration, and therefore, can easily identify the vibration source.

For example, when a controller vibrates, it may difficult for the player to identify the cause of the vibration of the controller. In particular, in a case where different vibrations are caused by different factors, it is difficult for the player to identify the cause of each vibration. For example, it is assumed that, in a game, a vibration occurs due to a predetermined operation performed by the player, and a plurality of objects are present in a virtual space, and a vibration occurs due to each object. In this case, it is difficult for the player to recognize whether a vibration has occurred due to the operation or any of the object. Further, when a vibration is occurring with a player character being moving on a relatively large surface, it is difficult for the player to recognize what causes the vibration of the controller because the vibration continues to occur.

In the exemplary embodiment, when a player character is in contact with a predetermined surface, a vibration occurs. When the player character is temporarily away from the predetermined surface, the vibration is temporarily stopped. Therefore, the player can easily recognize that the predetermined surface is vibrating.

Further, a vibration occurs due to an operation object being in contact with a predetermined surface. Therefore, the player feels as if the player itself were in contact with the predetermined surface in the virtual space, resulting in an increase in sense of realism in the game.

(Variations)

In the foregoing, the exemplary embodiment has been described. In other exemplary embodiments, the following features may be provided.

For example, in the above exemplary embodiment, it is assumed that the vibrations of the vibrators 107 and 117 are temporarily stopped by temporarily stopping the generation and output of the vibration control signals. In another exemplary embodiment, vibration control signals having an amplitude of "0" or substantially "0" may be generated and output to the left and right controllers 3 and 4 so that the vibrations of the vibrators 107 and 117 are temporarily stopped.

Further, in the above exemplary embodiment, a vibration occurs when an operation object is in contact with a predetermined surface. A vibration may occur not only when an operation object is perfectly in contact with a predetermined surface, but also when an operation object is in a slight floating state over a predetermined surface. In this case, when an operation object performs a motion of leaving a predetermined surface, a vibration is stopped. That is, when an operation object is in contact with a predetermined surface (the operation object is perfectly in contact with the predetermined surface, or the operation object is slightly floating), a vibration may occurs, and when an operation object performs a motion of leaving a predetermined surface, a vibration may not occur.

Further, in the above exemplary embodiment, it is assumed that a ground vibrates in a virtual space. In another exemplary embodiment, any other suitable object may vibrate. In this case, when a player character is in contact with a predetermined surface forming the object (a surface forming all or a portion of the object; the surface may be either a curved surface or a plane), the left and right controllers 3 and 4 are caused to vibrate. On the other hand, when the player character is not in contact with the predetermined surface forming the object, none of the left and right controllers 3 and 4 is caused to vibrate. For example, the above game may be performed, assuming that a wall object (or another object buried inside the wall object) vibrates. Further, when a player character is in or on a vehicle object, the vehicle object may be a vibration source. In this case, when the player character is in contact with a predetermined surface forming the vehicle object, the left and right controllers 3 and 4 may vibrate, and when the player character is temporarily away from the predetermined surface forming the vehicle object (e.g., the player character performs a jumping motion, so that the player character is temporarily away from the vehicle object), none of the left and right controllers 3 and 4 may vibrate.

Further, in the above exemplary embodiment, it is assumed that two controllers (3 and 4) are caused to vibrate. Alternatively, one or at least three controllers may be caused to vibrate.

Further, in the above exemplary embodiment, it is assumed that the left and right controllers 3 and 4 are attachable and detachable to and from the main body apparatus 2. In another exemplary embodiment, the left and right controllers 3 and 4 may be integrated with the main body apparatus 2 so that the left and right controllers 3 and 4 are not detachable from the main body apparatus 2.

Further, a single operation device in which the left and right controllers 3 and 4 are integrated together may be used. In this case, the operation device may have a left portion and a right portion. A vibrator may be provided in the left portion, and another vibrator may be provided in the right portion. The two vibrators may be caused to vibrate. Alternatively, a single vibrator may be provided in the operation device, and may be caused to vibrate.

Further, in the above exemplary embodiment, it is assumed that the processor 81 of the main body apparatus 2 functions as the character control section 200, the image generation section 201, and the vibration controller 202. In another exemplary embodiment, at least one processor included in the game system 1 may function as the character control section 200, the image generation section 201, and the vibration controller 202. For example, the left and right controllers 3 and 4 may function as the vibration controller 202. For example, the left and right controllers 3 and 4 may generate the vibration control signals for causing the vibrators 107 and 117 to vibrate, in accordance with a command from the main body apparatus 2, and output the vibration control signals to the vibrators 107 and 117.

Further, the above game may be played in an information processing system in which a plurality of devices are connected together via a network (e.g., the Internet or a LAN). For example, a terminal and a server may be connected together via the Internet to constitute the above system. In this case, for example, the terminal may be provided with operation devices that are counterparts of the left and right controllers 3 and 4, and a display device, and the server may be provided with the character control section 200, the image generation section 201, and the vibration signal generator 202. The terminal transmits, to the server, operation data corresponding to an operation performed on the operation device by a player. The server controls a player character, etc., based on the operation data to generate an image, and generates a vibration control signal according to whether or not the player character is in contact with a predetermined surface, and transmits the image and the vibration control signal to the terminal. Thereafter, the terminal receives the image and the vibration control signal from the server, and displays the image on the display device, and causes the operation device to vibrate.

Further, the above game may be played in other systems (or devices), such as a personal computer, a smartphone, a tablet terminal, etc. Further, in the game system 1 or other systems, other applications may be executed in addition to the above game.

In the foregoing, the exemplary embodiment has been described. The above description of the exemplary embodiment is merely illustrative. Various modifications and changes may be made thereto.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory storage medium having stored therein a game program executable by a computer of an information processing apparatus, the program causing the computer to execute operations comprising:
controlling an operation object in a virtual space, based on an operation performed by a player, and if the operation is performed with the operation object being in contact with a surface in the virtual space, causing the operation object to perform a motion of leaving the surface;
controlling a first vibrator and a second vibrator such that the first and second vibrators perform a first vibration with respective vibration strengths that are based on a positional relationship in the virtual space between the operation object and a vibration object, when the operation object is in contact with the surface in the virtual space; and
controlling the first and second vibrators to not perform the first vibration when the operation object is away from contact with the surface due to the motion.

2. The non-transitory storage medium according to claim 1, wherein
controlling the first and second vibrators further includes controlling the first and second vibrators, based on a game process, such that the first and second vibrators performs a second vibration different from the first vibration, and
when the first and second vibrators are controlled to perform the second vibration, controlling the first and second vibrators to perform the first and second vibrations when the operation object is in contact with the surface, and controlling the first and second vibrators to perform the second vibration without performing the first vibration when the operation object is away from the surface due to the motion.

3. The non-transitory storage medium according to claim 1, wherein
the surface is a ground set in the virtual space.

4. The non-transitory storage medium according to claim 1, wherein
the motion of leaving the surface is a jumping motion of the operation object.

5. The non-transitory storage medium according to claim 1, wherein
controlling the vibrator includes controlling a vibration strength of each of the first and second vibrators according to the location of the operation object.

6. The storage medium of claim 1 wherein the first vibrator is disposed in a left handheld and the second vibrator is disposed in a right handheld separate from the left handheld, the left and right handhelds being selectively attachable to and detachable from a housing providing a display that displays views of the virtual space including the operation object.

7. An information processing apparatus comprising:
an operation object controller configured to control an operation object in a virtual space, based on an operation performed by a player, and if the operation is performed with the operation object being in contact with a surface in the virtual space, causes the operation object to perform a motion of leaving the surface; and
a vibration controller configured to control a first vibrator and a second vibrator such that the first and second vibrators performs a first vibration with respective vibration strengths that are based on a positional relationship in the virtual space between the operation object and a vibration object, when the operation object is in contact with the surface in the virtual space, and to control the first and second vibrators to not perform the first vibration when the operation object is away from contact with the surface due to the motion.

8. The information processing apparatus according to claim 7, wherein
the vibration controller is further configured to control the first and second vibrators, based on a game process, such that the first and second vibrators performs a second vibration different from the first vibration, and
when causing the first and second vibrators to perform the second vibration, the vibration controller controls the first and second vibrators such that the first and second vibrators performs the first and second vibrations when the operation object is in contact with the surface, and the first and second vibrators perform the second vibration without performing the first vibration when the operation object is away from the surface due to the motion.

9. The information processing apparatus according to claim 7, wherein
the surface is a ground set in the virtual space.

10. The information processing apparatus according to claim 7, wherein
the motion of leaving the surface is a jumping motion of the operation object.

11. The information processing apparatus according to claim 7, wherein
the vibration controller controls a vibration strength of each of the first and second vibrators, based on a location of the operation object.

12. The information processing apparatus of claim 7 wherein the first vibrator is disposed in a left handheld and the second vibrator is disposed in a right handheld separate from the left handheld, the left and right handhelds being selectively attachable to and detachable from a housing providing a display that displays views of the virtual space including the operation object.

13. An information processing system comprising:
a first vibrator and a second vibrator;
an operation object controller configured to control an operation object in a virtual space, based on an operation performed by a player, and if the operation is performed with the operation object being in contact with a surface in the virtual space, causes the operation object to perform a motion of leaving the surface; and
a vibration controller configured to control the first and second vibrators such that the first and second vibrators performs a first vibration with respective vibration strengths that are based on a positional relationship in the virtual space between the operation object and a vibration object, when the operation object is in contact with the surface in the virtual space, and to control the first and second vibrators to not perform the first vibration when the operation object is away from contact with the surface due to the motion.

14. The information processing system according to claim 13, wherein
the vibration controller is further configured to control the first and second vibrators, based on a game process, such that the first and second vibrators perform a second vibration different from the first vibration, and
when causing the first and second vibrators to perform the second vibration, the vibration controller controls the first and second vibrators such that the first and second vibrators perform the first and second vibrations when the operation object is in contact with the surface, and the first and second vibrators performs the second vibration without performing the first vibration when the operation object is away from the surface due to the motion.

15. The information processing system according to claim 13, wherein
the surface is a ground set in the virtual space.

16. The information processing system according to claim 13, wherein
the motion of leaving the surface is a jumping motion of the operation object.

17. The information processing system according to claim 13, wherein
the vibration controller controls a vibration strength of each of the first and second vibrators according to a location of the operation object.

18. The information processing system of claim 13 wherein the first vibrator is disposed in a left handheld and the second vibrator is disposed in a right handheld separate from the left handheld, the left and right handhelds being selectively attachable to and detachable from a housing providing a display that displays views of the virtual space including the operation object.

19. An information processing method for use in an information processing system, the method comprising:
controlling an operation object in a virtual space, based on an operation performed by a player, and if the operation is performed with the operation object being in contact with a surface in the virtual space, causing the operation object to perform a motion of leaving the surface; and
controlling a first vibrator and a second vibrator such that the first and second vibrators performs a first vibration with respective strengths that are based on a positional relationship in the virtual space between the operation object and a vibration object, when the operation object is in contact with the surface in the virtual space, and such that the first and second vibrators do not perform the first vibration when the operation object is away from contact with the surface due to the motion.

20. The information processing method according to claim 19, wherein
controlling the first and second vibrators further includes
controlling the first and second vibrators, based on a game process, such that the first and second vibrators performs a second vibration different from the first vibration, and
when the first and second vibrators are caused to perform the second vibration, the first and second vibrators are controlled to perform the first and second vibrations when the operation object is in contact with the surface, and the first and second vibrators are controlled to perform the second vibration without performing the first vibration when the operation object is away from the surface due to the motion.

21. The information processing method according to claim 19, wherein
the surface is a ground set in the virtual space.

22. The information processing method according to claim 19, wherein
the motion of leaving the surface is a jumping motion of the operation object.

23. The information processing method according to claim 19, wherein
controlling the first and second vibrators includes controlling a vibration strength of each of the first and second vibrators according to a location of the operation object.

24. The information processing system of claim 19 wherein the first vibrator is disposed in a left handheld and the second vibrator is disposed in a right handheld separate from the left handheld, the left and right handhelds being selectively attachable to and detachable from a housing providing a display that displays views of the virtual space including the operation object.

* * * * *